(12) United States Patent
Noguchi

(10) Patent No.: US 10,977,848 B2
(45) Date of Patent: Apr. 13, 2021

(54) COMPOSITE IMAGE GENERATING APPARATUS, COMPOSITE IMAGE GENERATING METHOD, AND PROGRAM

(71) Applicant: FUJIFILM Corporation, Tokyo (JP)

(72) Inventor: Yukinori Noguchi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 112 days.

(21) Appl. No.: 16/542,064

(22) Filed: Aug. 15, 2019

(65) Prior Publication Data
US 2019/0371027 A1    Dec. 5, 2019

Related U.S. Application Data

(63) Continuation of application No. PCT/JP2018/006336, filed on Feb. 22, 2018.

(30) Foreign Application Priority Data

Mar. 15, 2017  (JP) .............................. JP2017-049940

(51) Int. Cl.
*G06T 11/60* (2006.01)
*G06F 3/0484* (2013.01)

(52) U.S. Cl.
CPC .......... *G06T 11/60* (2013.01); *G06F 3/04847* (2013.01); *G06T 2200/24* (2013.01)

(58) Field of Classification Search
CPC . G06T 5/00; G06T 11/00; G06T 11/60; G06T 2200/24; G06F 3/03548; G06F 3/04847; H04N 1/387

(Continued)

(56) References Cited

U.S. PATENT DOCUMENTS 5,875,265 A    2/1999  Kasao
6,647,153 B1   11/2003 Ito
(Continued)

FOREIGN PATENT DOCUMENTS

JP    H09-16797 A    1/1997
JP    H09-305598 A   11/1997
(Continued)

OTHER PUBLICATIONS

An Office Action mailed by the Japanese Patent Office dated Mar. 17, 2020, which corresponds to Japanese Patent Application No. 2019-505814 and is related to U.S. Appl. No. 16/542,064.
(Continued)

*Primary Examiner* — Sae Won Yoon
(74) *Attorney, Agent, or Firm* — Studebaker & Brackett PC

(57) ABSTRACT

Provided are a composite image generating apparatus, a composite image generating method, a composite image generating program for obtaining a composite image having a user's desired impression. A first mount image 51 is determined on the basis of an impression value along a first impression axis, with respect to a composite target image 50. The composite target image 50 and the first mount image 51 are combined to obtain a first composite image Sy1. A user moves a slider 63 of a first desired impression value designating slider axis 62 corresponding to the first impression axis to designate an unspecified desired impression value. A second mount image having the designated desired impression value is determined, the second mount image, instead of the first mount image 51, and the composite target image 50 are combined to obtain a second composite image having the user's desired impression.

13 Claims, 24 Drawing Sheets

(58) Field of Classification Search
USPC .......................................................... 345/634
See application file for complete search history.

(56) References Cited

U.S. PATENT DOCUMENTS

| | | | | |
|---|---|---|---|---|
| 2006/0244765 | A1* | 11/2006 | Isomura | G06T 11/60 345/635 |
| 2008/0050039 | A1 | 2/2008 | Jin | |
| 2012/0102398 | A1* | 4/2012 | Cok | G06F 40/186 715/274 |
| 2016/0063746 | A1* | 3/2016 | Furuya | G06T 3/4053 382/209 |
| 2017/0061642 | A1* | 3/2017 | Wang | G06T 11/60 |
| 2017/0262141 | A1* | 9/2017 | Soga | G06F 40/186 |
| 2017/0345200 | A1 | 11/2017 | Furuya | |

FOREIGN PATENT DOCUMENTS

| | | |
|---|---|---|
| JP | 2000-253227 A | 9/2000 |
| JP | 2005-031977 A | 2/2005 |
| JP | 2006-221600 A | 8/2006 |
| JP | 2008-052326 A | 3/2008 |
| JP | 2011-044124 A | 3/2011 |
| JP | 2011-180968 A | 9/2011 |
| JP | 2015-162850 A | 9/2015 |
| JP | 2016-170465 A | 9/2016 |

OTHER PUBLICATIONS

International Search Report issued in PCT/JP2018/006336; dated Mar. 27, 2018.
International Preliminary Report on Patentability and Written Opinion issued in PCT/JP2018/006336; dated Sep. 17, 2019.

\* cited by examiner

COMPOSITE IMAGE GENERATING APPARATUS, COMPOSITE IMAGE GENERATING METHOD, AND PROGRAM

CROSS REFERENCE TO RELATED APPLICATIONS

This application is a Continuation of PCT International Application No. PCT/JP2018/006336 filed on Feb. 22, 2018, which claims priority under 35 U.S.C § 119(a) to Patent Application No. 2017-049940 filed in Japan on Mar. 15, 2017, all of which are hereby expressly incorporated by reference into the present application.

BACKGROUND OF THE INVENTION

1. Field of the Invention

The present invention relates to a composite image generating apparatus, a composite image generating method, and a non-transitory computer readable recording medium storing a program.

2. Description of the Related Art

A technique in which a user pastes a composite target image to a mount image of a template or the like, as in a postcard, an electronic album, or a photo book, to generate a user's desired composite image has been realized. For example, in order to enhance a balance between a template image and a target image to be combined with the template image, a technique for designating a subject in the target image and combining an image in a composite area in which the subject is included and the template image is disclosed (JP2016-170465A). Further, in a case where a target image is pasted to a template image to generate a composite image, in order to match a completed impression with a user's preference, a technique for designating the completed impression of the composite image by a user, determining a template image close to the impression and a target image, and correcting the target image to be close to the designated impression is disclosed (JP2015-162850A). Further, a technique for changing a color of a predetermined portion in a template image is disclosed (JP2011-180968A), and a technique for setting an evaluation item and selecting a template suitable for the evaluation item is disclosed (JP2008-052326A).

SUMMARY OF THE INVENTION

However, the technique disclosed in JP2016-170465A considers the balance between the template image and the target image, but does not consider an impression of the template image. In the technique disclosed in JP2015-162850A, the target image is corrected. In the technique disclosed in JP2011-180968A, since the color of the predetermined portion in the template image is merely changed, it is not possible to know whether a composite image having a user's desired impression is obtained. Since the technique disclosed in JP2008-052326A merely selects the template suitable of the evaluation item, it is not possible to know whether a composite image having a user's desired impression is obtained.

An object of the invention is to provide a technique capable of obtaining a composite image having a user's desired impression.

According to an aspect of the invention, there is provided a composite image generating apparatus comprising: composite target image input unit that inputs a composite target image; first mount image determining unit that determines a first mount image on the basis of an impression value along a first impression axis, with respect to the composite target image input through the composite target image input unit; first composite image generating unit that combines at least a part of the composite target images input through the composite target image input unit and the first mount image determined by the first mount image determining unit to generate a first composite image; first composite target image display control unit that displays the first composite image generated by the first composite image generating unit; first desired impression value designating unit that designates a first desired impression value on the first impression axis; second mount image determining unit that determines a second mount image on the basis of the first desired impression value designated by the first desired impression value designating unit; second composite image generating unit that combines at least a part of the composite target images input through the composite target image input unit and the second mount image determined by the second mount image determining unit to generate a second composite image; and second composite image display control unit that displays the second composite image generated by the second composite image generating unit.

Further, the composite image generating apparatus may include a processor circuit, and the processor circuit may perform inputting a composite target image, determining a first mount image on the basis of an impression value along a first impression axis, with respect to the input composite target image, combining at least a part of the input composite target images and the determined first mount image to generate a first composite image, displaying the generated first composite image, designating a first desired impression value on the first impression axis, determining a second mount image on the basis of the designated first desired impression value, combining at least a part of the input composite target images and the determined second mount image to generate a second composite image, and displaying the generated second composite image.

According to another aspect of the invention, there is provided a composite image generating method. The composite image generating method comprises: inputting a composite target image, using composite target image input unit; determining a first mount image on the basis of an impression value along a first impression axis, with respect to the composite target image input through the composite target image input unit, using first mount image determining unit; combining at least a part of the composite target images input through the composite target image input unit and the first mount image determined by the first mount image determining unit to generate a first composite image, using first composite image generating unit; displaying the first composite image generated by the first composite image generating unit, using first composite target image display control unit; designating a first desired impression value on the first impression axis, using first desired impression value designating unit; determining a second mount image on the basis of the first desired impression value designated by the first desired impression value designating unit, using a second mount image determining unit; combining at least a part of the composite target images input through the composite target image input unit and the second mount image determined by the second mount image determining unit to generate a second composite image, using a second composite image generating unit; and displaying the second composite image generated by the second composite image generating unit, using second composite image display control unit.

According to still another aspect of the invention, there are provided a non-transitory computer-readable program for controlling a computer of an composite image generating apparatus, and a recording medium storing the program.

A plurality of the composite target images may be input through the composite target image input unit. Further, the composite image generating apparatus may further comprise impression value distributing unit that distributes impression values of the plurality of composite target images input through the composite target image input unit in an impression area defined by at least two impression axes, and first impression axis determining unit that determines an axis on which a dispersion of the impression values distributed in the impression area by the impression value distributing unit becomes the maximum, as the first impression axis.

The first impression axis determining unit may determine an axis on which the dispersion of the impression values distributed in the impression area by the impression value distributing unit becomes the maximum, among a plurality of impression axes that are determined in advance, as the first impression axis.

The composite image generating apparatus may further comprise first desired impression strength designating unit that designates a first desired impression strength. In this case, the second mount image determining unit may determine the second mount image on the basis of the first desired impression value designated by the first desired impression value designation unit and the first desired impression strength designated by the first desired impression strength designating unit.

The composite image generating apparatus may further comprise: second impression axis determining unit that determines a second impression axis on the basis of the first desired impression value designated by the first desired impression value designating unit; second desired impression value designating unit that designates a second desired impression value on the second impression axis determined by the second impression axis determining unit; third mount image determining unit that determines a third mount image on the basis of the second desired impression value designated by the second desired impression value designating unit; third composite image generating unit that combines at least a part of the composite target images input through the composite target image input unit and the third mount image determined by the third mount image determining unit to generate a third composite image; and third composite image display control unit that displays the third composite image generated by the third composite image generating unit.

The composite image generating apparatus may further comprise second desired impression strength designating unit that designates a second desired impression strength. In this case, the third mount image determining unit may determine the third mount image on the basis of the second desired impression value designated by the second desired impression value designating unit and the second desired impression strength designated by the second desired impression strength designating unit.

The first mount image determining unit may determine the first mount image on the basis of a plurality of impression values along a plurality of the first impression axes with respect to the composite target image input through the composite target image input unit.

The first impression axis may include a main impression axis and a sub-impression axis, for example. In this case, the first impression axis determining unit may determine the axis on which the dispersion of the impression values distributed in the impression area by the impression value distributing unit becomes the maximum as the main impression axis, and may determine an axis on which the dispersion becomes the second maximum as the sub-impression axis, and the first mount image determining unit may determine the first mount image on the basis of impression values along the main impression axis and the sub-impression axis with respect to the composite target image input through the composite target image input unit.

The first impression axis may include a main impression axis and a sub-impression axis. In this case, the first impression axis determining unit may determine the axis on which the dispersion of the impression values distributed in the impression area by the impression value distributing unit becomes the maximum, as the main impression axis, and the first desired impression value designating unit may designate the first desired impression value on the main impression axis. The first impression axis determining unit may determine an impression axis that passes through the designated first desired impression value and is different from the main impression axis as the sub-impression axis, and the first mount image determining unit may determine the first mount image on the basis of impression values along the main impression axis and the sub-impression axis with respect to the composite target image input through the composite target image input unit.

The first mount image determining unit may include design parameter determining unit that determines a design parameter for setting disposition of the composite target image in the first mount image on the basis of the impression values along the first impression axis with respect to the composite target image input through the composite target image input unit, and background image determining unit that determines a background image on the basis of the impression values along on the first impression axis with respect to the composite target image input through the composite target image input unit. In this case, the determination of the design parameter in the design parameter determining unit and the determination of the background image in the background image determining unit may correspond to the determination of the first mount image.

According to the invention, a first mount image is determined on the basis of an impression value along a first impression axis, with respect to a composite target image. The determined first mount image and at least a part of the composite target images are combined, so that a first composite image is obtained. The obtained first composite image is displayed, and a user designates a first desired impression value on the first impression axis while looking at the displayed first composite image. A second mount image is determined on the basis of the designated first desired impression value. The determined second mount image and at least a part of the composite target images are combined, so that a second composite image is obtained. Since a user can designate a desired impression value in a state where the user confirms the initially obtained first composite image and the second mount image is determined from the designated desired impression value to obtain the second composite image, it is possible to obtain a composite image suitable for the user's desired impression.

DESCRIPTION OF THE PREFERRED EMBODIMENTS

First Embodiment

Figure 1:
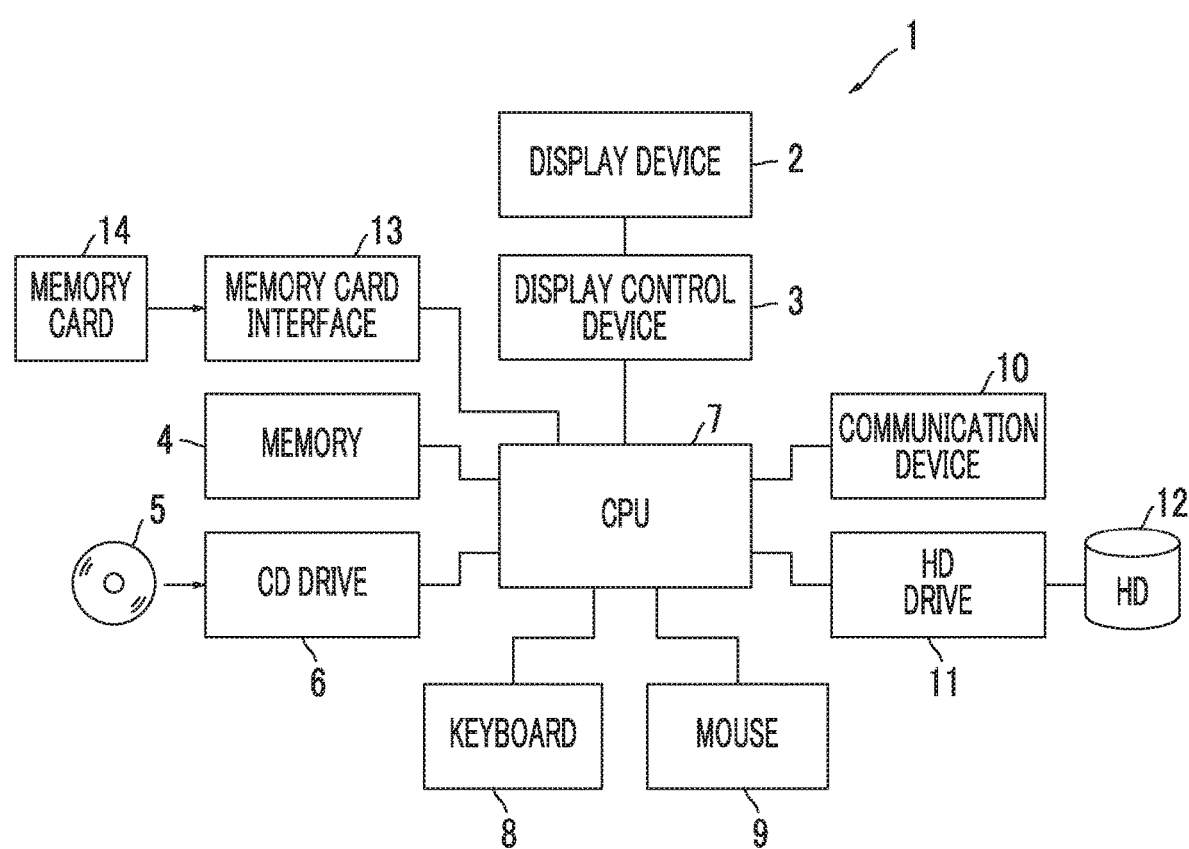
FIG. 1 is a block diagram showing an electric configuration of a composite image generating apparatus.

FIG. 1 shows an embodiment of the invention, which is a block diagram showing an electric configuration of a composite image generating apparatus 1.

An overall operation of the composite image generating apparatus 1 is generally controlled by a central processing unit (CPU) 7.

The composite image generating apparatus 1 includes a display device 2 that is controlled by a display control device 3, a memory 4 that temporarily stores data, a compact disc (CD) drive 6 for accessing a compact disc 5, a keyboard 8 and a mouse 9 through which a user gives a command to the composite image generating apparatus 1. Further, the composite image generating apparatus 1 also includes a hard disk (HD) drive 11 for accessing a hard disk (HD) 12, and a communication device 10 for communicating with a server (not shown) or the like. In addition, the composite image generating apparatus 1 further includes a memory card interface 13 for reading image data or the like stored in a memory card 14.

The compact disc 5 in which a program for controlling operations (which will be described later) is stored is loaded in the composite image generating apparatus 1, and the program stored in the compact disc 5 is read by the compact disc drive 6. As the read program is installed in the composite image generating apparatus 1, the composite image generating apparatus 1 performs the operations to be described later. The program that controls the composite image generating apparatus 1 may be a program that is read from a recording medium such as the compact disc 5, or may be a program that is transmitted and received through the Internet.

Figure 2:
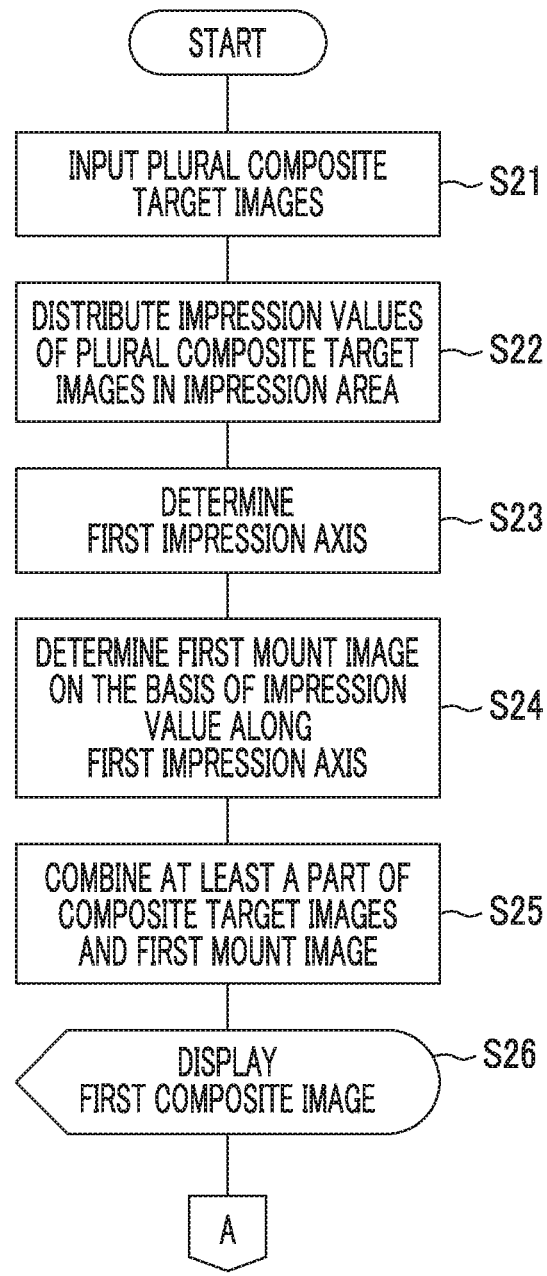
FIG. 2 is a flowchart showing a processing procedure of the composite image generating apparatus.
Figure 3:
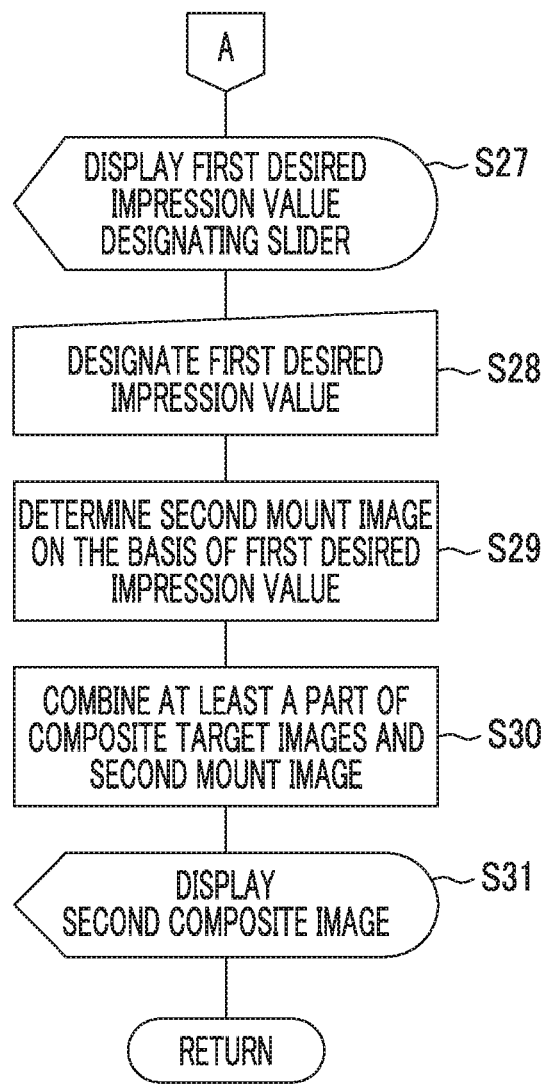
FIG. 3 is a flowchart showing a processing procedure of the composite image generating apparatus.

FIGS. 2 and 3 are flowcharts showing a processing procedure of the composite image generating apparatus 1.

A user loads the memory card 14 in which (files indicating) a plurality of composite target images are stored in the composite image generating apparatus 1, and inputs the plurality of composite target images in the composite image generating apparatus 1 through the memory card interface 13 (composite target image input unit) (step 21). All images stored in the memory card 14 may be used as the composite target images. Alternatively, in a case where folders are formed in the memory card 14 and the images are stored in the folders, a folder may be designated, and all images stored in the designated folder may be used as the composite target images and may be input to the composite image generating apparatus 1. The images are not limited to the images stored in the memory card 14, and instead, images stored in the compact disc 5 or images stored in the hard disk 12 may be designated, and the designated images may be used as the composite target images.

In a case where the plurality of composite target images are input (designated) to the composite image generating apparatus 1, impression values of the plurality of input composite target images are distributed in an impression area regulated by reference impression axes (step 22).

Figure 4:
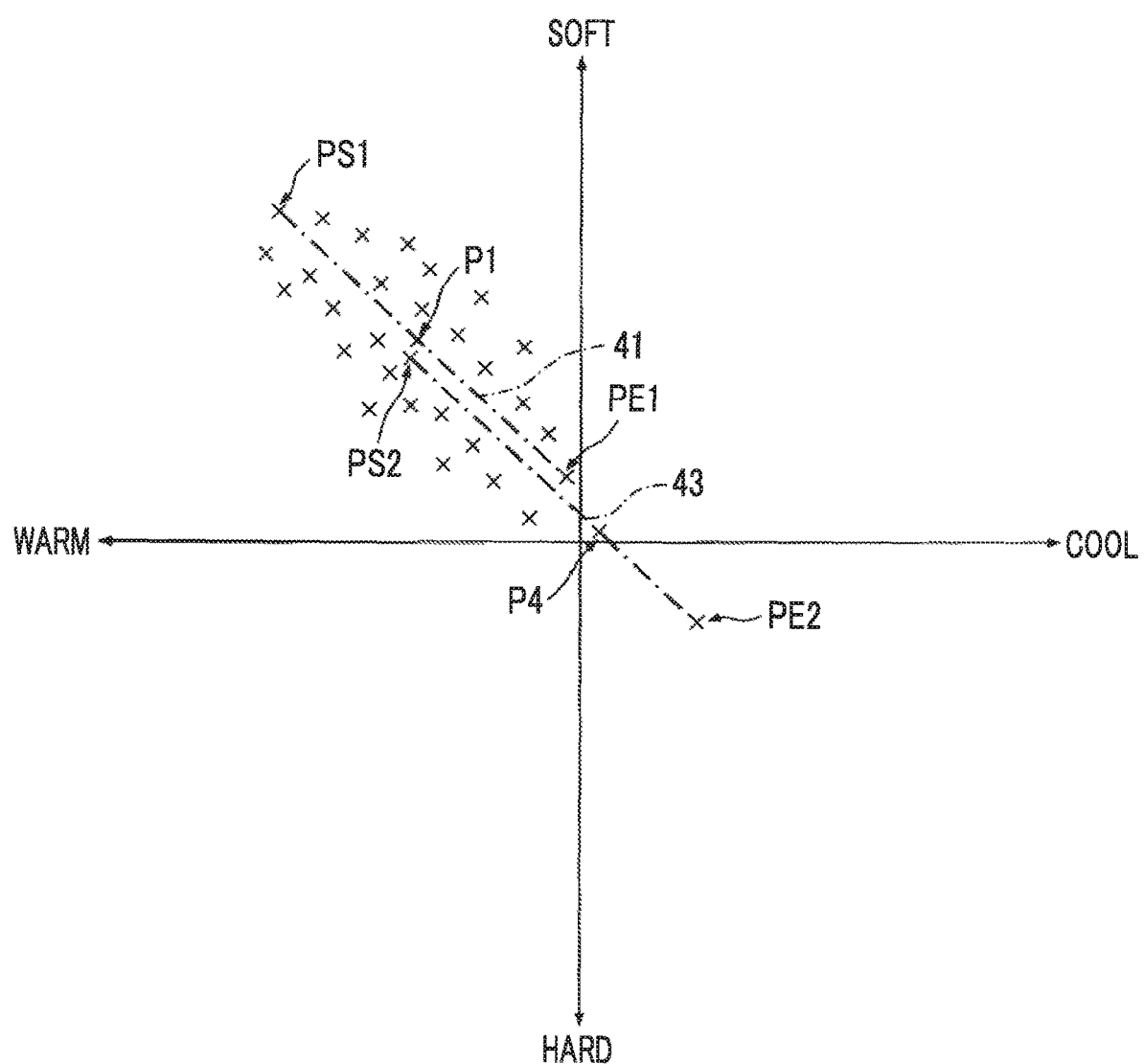
FIG. 4 is a diagram showing an example of an impression area.

FIG. 4 is a diagram showing an example of an impression area defined by two reference impression axes that are determined in advance.

A lateral axis among the reference impression axes of the impression area is defined by "warm" and "cool", and a longitudinal axis among the reference impression axes of the impression area is defined by "soft" and "hard". In each image of the composite target images, an impression value corresponding to "warm" and "cool", and an impression value corresponding to "soft" and "hard" are stored in a header of an image file, and on the basis of these impression values, impression values of the composite target images are plotted in the impression area shown in FIG. 4. In this way, the impression values of the composite target images are distributed in an impression area defined by at least two reference impression axes by the CPU 7 (impression value distributing unit). The distributed state is indicated by X marks. In a case where the impression values corresponding to "warm" and "cool" and the impression values corresponding to "soft" and "hard" are not stored in the headers of the image files, for example, a representative color is determined from a color distribution of the respective images of the composite target images, and an impression value corresponding to "warm" and "cool" and an impression value corresponding to "soft" and "hard" are determined with respect to the determined representative color. For each color, an impression value corresponding to "warm" and "cool", and an impression value corresponding to "soft" and "hard" are determined in advance. The representative color may be determined by the most frequent color in the images, an average color of a main subject in the images, or the like. Further, plural representative colors such as a first representative color or a second representative color may be determined to calculate impression values by a combination of the representative colors. Further, colors, textures, imaging locations, subjects, or the like in the images may be analyzed by a discriminator that is learned in advance through machine learning, to calculate corresponding impression values. In this case, such a discriminator extracts feature values from the colors, the textures, the imaging locations, and the subjects in the images, and performs learning for associating the feature values extracted from the images with the impression values. Specifically, the image analysis may be performed using an identifier obtained by a machine learning method such as SVM, Real AdaBoost, or Ada-Boost, and feature values such as a Haar-like feature value, an Edgelet feature value, an EOH feature value, and a HOG feature value.

In a case where the impression values of the plurality of composite target images are distributed in the impression area, an axis on which a dispersion of the impression values becomes the maximum is determined as a first impression axis by the CPU 7 (first impression axis determining unit) on the basis of the distribution (step 24). Determining an impression axis such that the dispersion of the impression values distributed in the impression area becomes the maximum as shown in FIG. 4 corresponds to calculating a regression line on the basis of the distribution of the impression values. A method for calculating the regression value is known, but specifically, is performed as follows. First, a standard deviation σx in a lateral axis direction indicated by the impression values of the plurality of composite target images and a standard deviation σy in a longitudinal axis direction are calculated, for each of the lateral axis and the longitudinal axis in the impression area, and a covariance of the respective images for each of the lateral axis and the longitudinal axis is calculated. A correlation coefficient r of the plurality of composite target images is calculated by dividing the calculated covariance by a product obtained by multiplying the standard deviations of the respective impression values on the lateral axis and the longitudinal axis. The regression line is expressed by the following expression (1).

$$(x-x0)/a = (y-y0)/b \quad (1)$$

Here, x0 represents an average value of impression values of respective images on the lateral axis, y0 represents an average value of the impression values of the respective images on the longitudinal axis, and a and b represent undetermined coefficients.

Further, since Expression (2) is established, a and b can be calculated from Expression (1) and Expression (2), and thus, it is possible to specifically calculate a first impression axis 41 in FIG. 4.

$$\sigma x/a = r \cdot (\sigma y/b) \quad (2)$$

One end point PS1 and the other end point PE1 on the first impression axis 41 in FIG. 4 may be a starting point and an end point of a distribution of the impression values in a direction of the first impression axis 41 in the distribution of the impression values.

Figure 5:
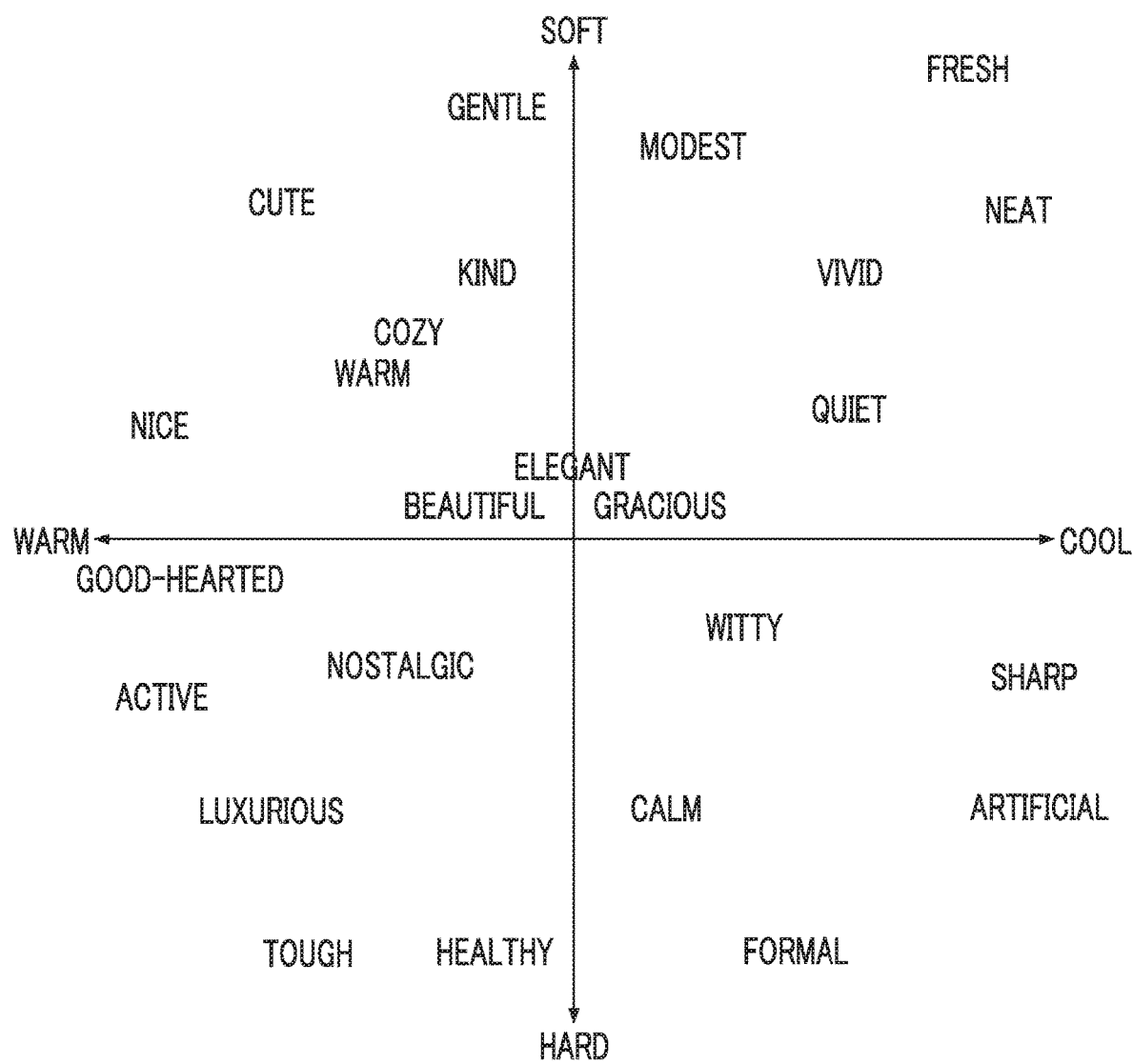
FIG. 5 is a diagram showing an example of an impression area.

FIG. 5 is a diagram showing an example of an impression area defined by a reference impression axis, in which a lateral axis represents an impression axis of "warm" and "cool", and a longitudinal axis represents an impression axis of "soft" and "hard", similar to the impression area shown in FIG. 4.

In the impression area shown in FIG. 5, sensibility words indicating impressions such as "mild" and "cute" corresponding to impression values defined by the reference impression axis are distributed. Sensibility words corresponding to one end point PS1 and the other end point PE1 of the first impression axis 41 determined in the impression area shown in FIG. 4 are read from the impression area shown in FIG. 5. The read impression words are obtained by expressing the impressions on the first impression axis 41 by words. For example, assuming that a sensibility word at a position of the impression area in FIG. 5 corresponding to the position of one end point PS1 of the first impression axis 41 is "cute" and a sensibility word at a position of the impression area in FIG. 5 corresponding to the position of the other end point PE1 of the first impression axis 41 is "elegant", the first impression axis becomes an impression axis that connects the "cute" impression and the "elegant" impression. In this way, an axis on which a dispersion of impression values distributed in an impression area among a plurality of impression axes becomes the maximum is determined as a first impression axis, by a CPU 7 (first impression axis determining unit). In the above-described embodiment, the plurality of impression axes such as the lateral axis of "warm" and "cool" and the longitudinal axis of "soft" and "hard" are determined in advance, but may be discretionally determined by a user or the like without being determined in advance. In a case where the impression axes are discretionally determined, similarly, the first impression axis may be determined. Further, in the above-described embodiment, the impression region is a two-dimensional area defined by two impression axes including the longitudinal axis and the lateral axis, but even in a three-dimensional or higher area defined by three or more impression axes, similarly, the first impression axis may be determined.

Subsequently, one composite target image among the plurality of composite target images is determined.

Figure 6:
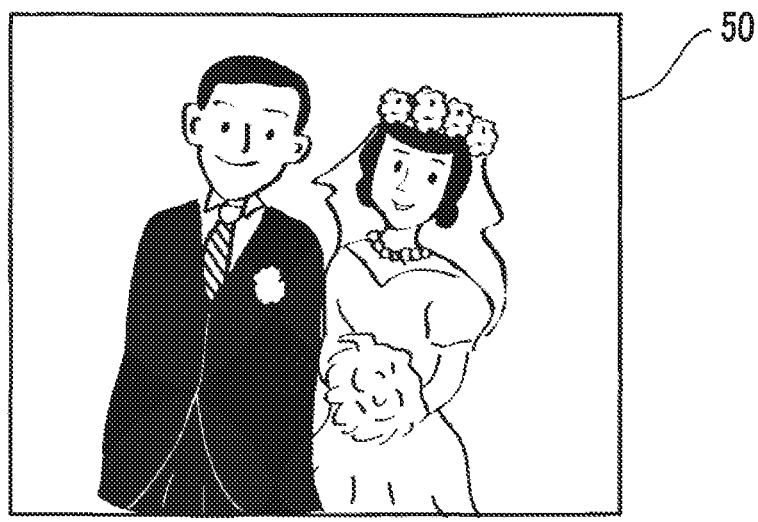
FIG. 6 is a diagram showing an example of a composite target image.

FIG. 6 is a diagram showing an example of one determined composite image.

One composite target image 50 shows one scene of a wedding ceremony.

A first mount image is determined by the CPU 7 (first mount image determining unit), on the basis of an impression value along a first impression axis, of the one determined composite target image 50 (step 24). For example, assuming that the impression value of the one composite target image 50 corresponds to a sign P1 in the impression area shown in FIG. 4, a mount image having an impression of the sign P1 is determined as a first mount image. A file indicating the mount image is stored in a hard disk 12 in advance. Further, an impression value of the mount image is also stored in advance in a header of the file indicating the mount image. The impression value of the mount image may be analyzed and calculated by a discriminator obtained by performing learning with respect to colors, textures, and the like of mounts through machine learning in advance, similar to the impression value of the composite target image. Assuming that an impression specified by the sign P1 in the impression area shown in FIG. 4 is an exactly intermediate impression between "cute" and "elegant" (for example, "cozy"), a mount image having the intermediate impression is determined as the first mount image.

Figure 7:
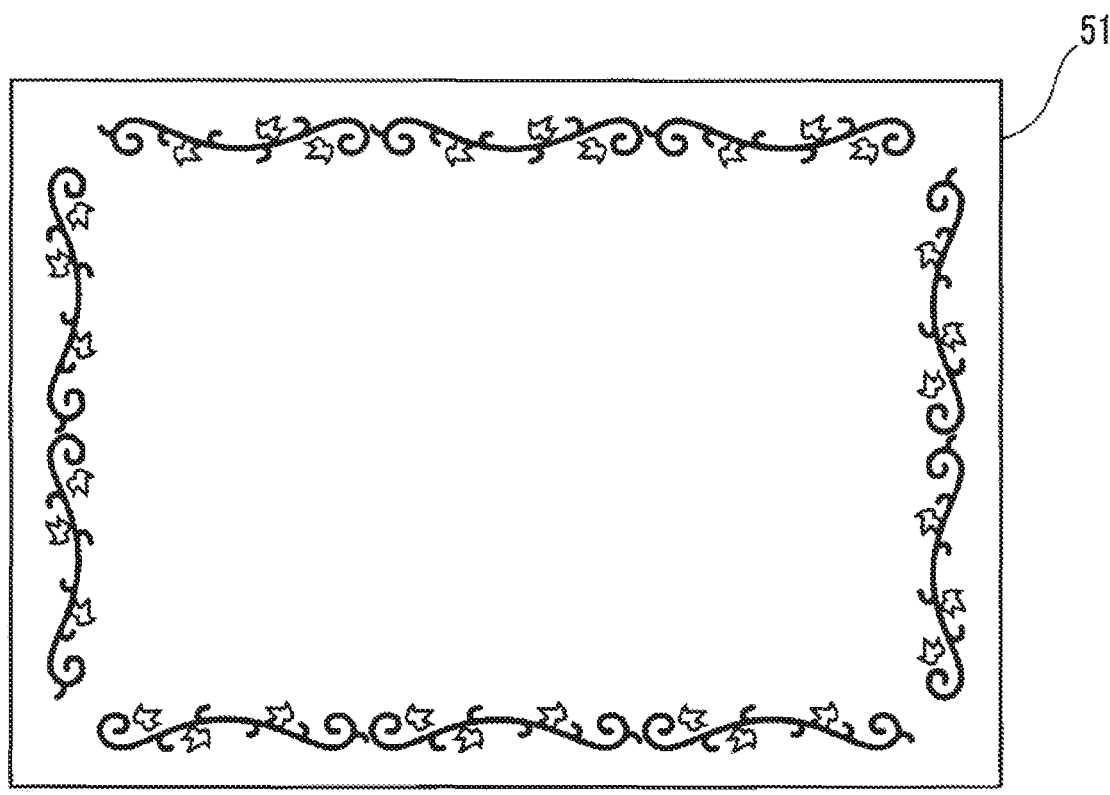
FIG. 7 is a diagram showing an example of a mount image.

FIG. 7 is a diagram showing an example of the determined first mount image.

The first mount image 51 has the same impression as the impression of one composite target image 50.

In this way, in a case where one composite target image 50 and the first mount image 51 are obtained, at least a partial image of the one composite target image 50 and the first mount image 51 are combined by the CPU 7 (first composite image generating unit), so that a first composite image is obtained (step 25). The obtained first composite image is displayed on a display screen of the display device 2 under the control of the display control device 3 (first composite target image display control unit) (step 26).

Figure 8:
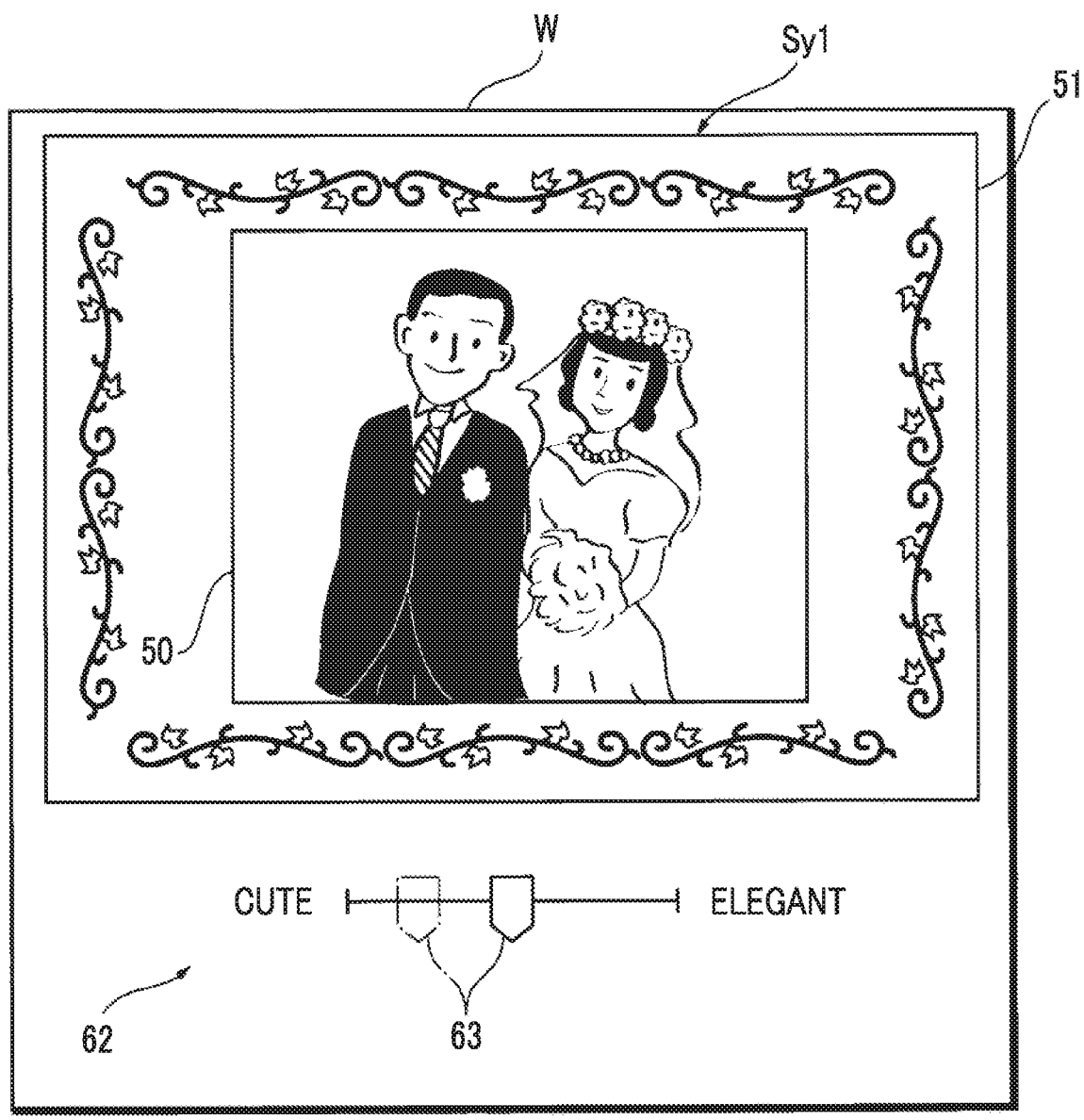
FIG. 8 is a diagram showing an example of a composite image.

FIG. 8 is a diagram showing an example of a window displayed on the display screen of the display device 2.

A first composite image Sy1 obtained by combining the first mount image 51 obtained as described above and the composite target image 50 is displayed on an window W.

Under the first composite image Sy1, a first desired impression value designating slider axis 62 is displayed (step 27). The first desired impression value designating slider axis 62 corresponds to the first impression axis 41 that defines an impression between the "cute" impression and the "elegant" impression determined as described above. On the first desired impression value designating slider axis 62, a slider 63 that is moved on the first desired impression value designating slider axis 62 is also displayed. By performing dragging on the first desired impression value designating slider axis 62 using the mouse 9, the slider 63 moves to an unspecified position on the first desired impression value designating slider axis 62. Since the impression of the composite target image 50 and the impression of the first mount image 51 are the same, it is considered that the first composite image Sy1 that is close to a user's preference is obtained, but there is a case where the first composite image Sy1 does not match a user's impression. In a case where the first composite image Sy1 does not match the user's impression, the user may move the slider 63 to change the mount image 51 to be combined with the composite target image 50. In a case where a desired impression value determining button (not shown) is clicked by moving the slider 63 (for example, by moving the slider 63 to a dotted chain line position) on the first desired impression value designating slider axis 62 using the mouse 9 (first desired impression value designating unit), a first desired impression value on the first impression axis 41 is designated (step 28).

In a case where the first desired impression value is designated, a mount image having the designated first desired impression value is found by the CPU 7 (second mount image determining unit) from mount images stored in the hard disk 12, and is determined as a second mount image (step 29). The determined second mount image and at least a partial image of the composite target image 50 are combined by the CPU 7 (second composite image generating unit), so that a second composite image is generated (step 30). The generated second composite image is displayed on the display screen of the display device 2 by the display control device 3 (second composite image display control unit) (step 31).

Figure 9:
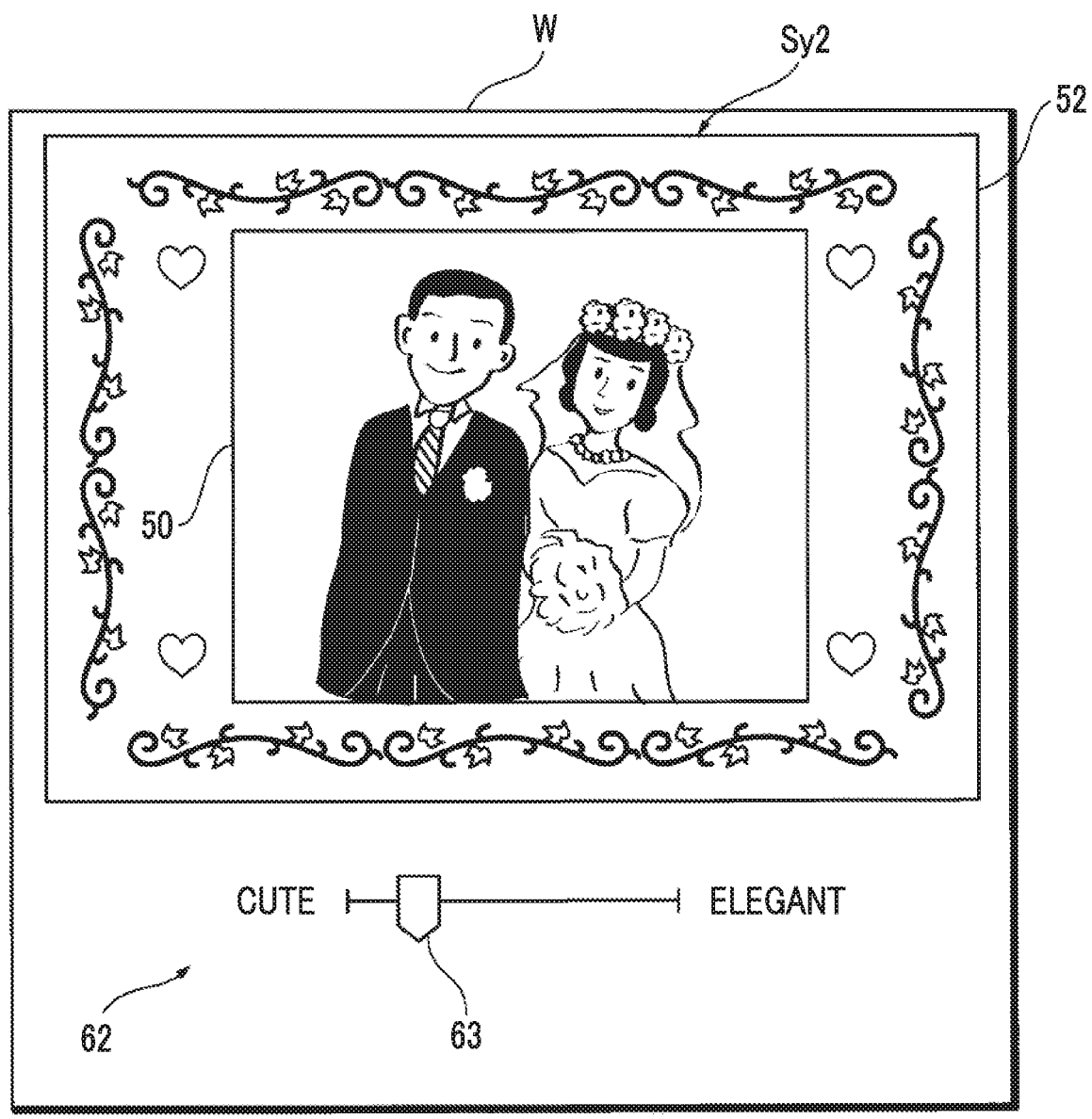
FIG. 9 is a diagram showing an example of a composite image.

FIG. 9 is a diagram showing an example of a window displayed on the display screen of the display device 2.

A newly generated second composite image Sy2 is displayed on the window W. The second composite image Sy2 is obtained by combining the second mount image 52 determined as described above and the composite target image 50. Since the slider 63 is moved on the first desired impression value designating slider axis 62 in the direction of the "cute" impression, the impression of the second mount image 52 has the "cute" impression rather than the impression of the first mount image 51 that has been first determined. In this way, it is possible to change the impression of the mount image without deviating from the impression defined by the determined first impression axis 41.

With respect to images other than one composite image 50, among the plurality of input composite target images, similarly, composite images are generated. Further, in the above-described embodiment, the plurality of composite target images are input to determine the first impression axis from the distribution of the impression values of the composite target images, but one composite target image may be input to the composite image generating device 1 to determine a first impression axis. In a case where one composite target image is input to the composite image generating device 1, for example, an unspecified impression axis that passes through an impression value of one composite target image may be set as the first impression axis.

In this way, in a case where the user does not like the mount image 51 having the same impression as the impression of the composite target image 50, the mount image 51 may be changed to the mount image 52 having a different impression.

Second Embodiment

Figure 10:
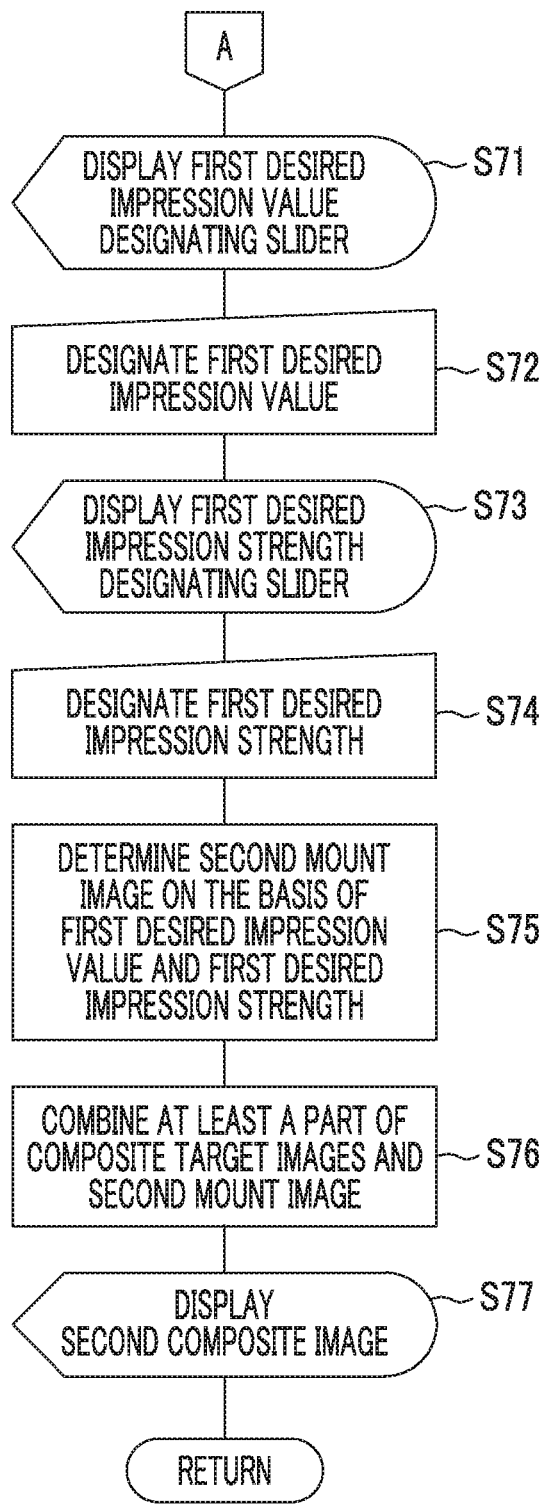
FIG. 10 is a flowchart showing a processing procedure of the composite image generating apparatus.
Figure 11:
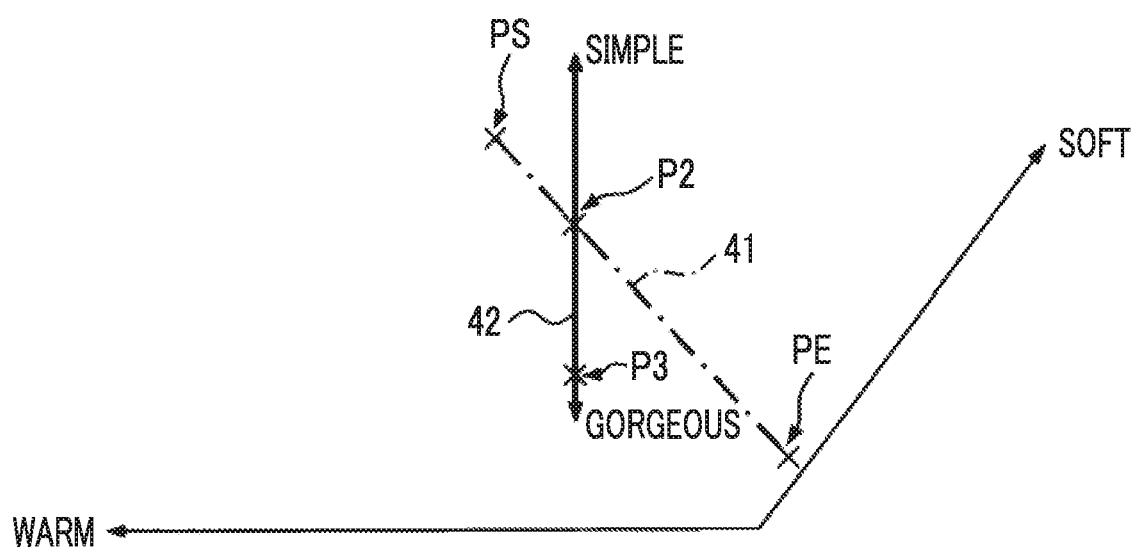
FIG. 11 is a diagram showing an example of an impression area.
Figure 12:
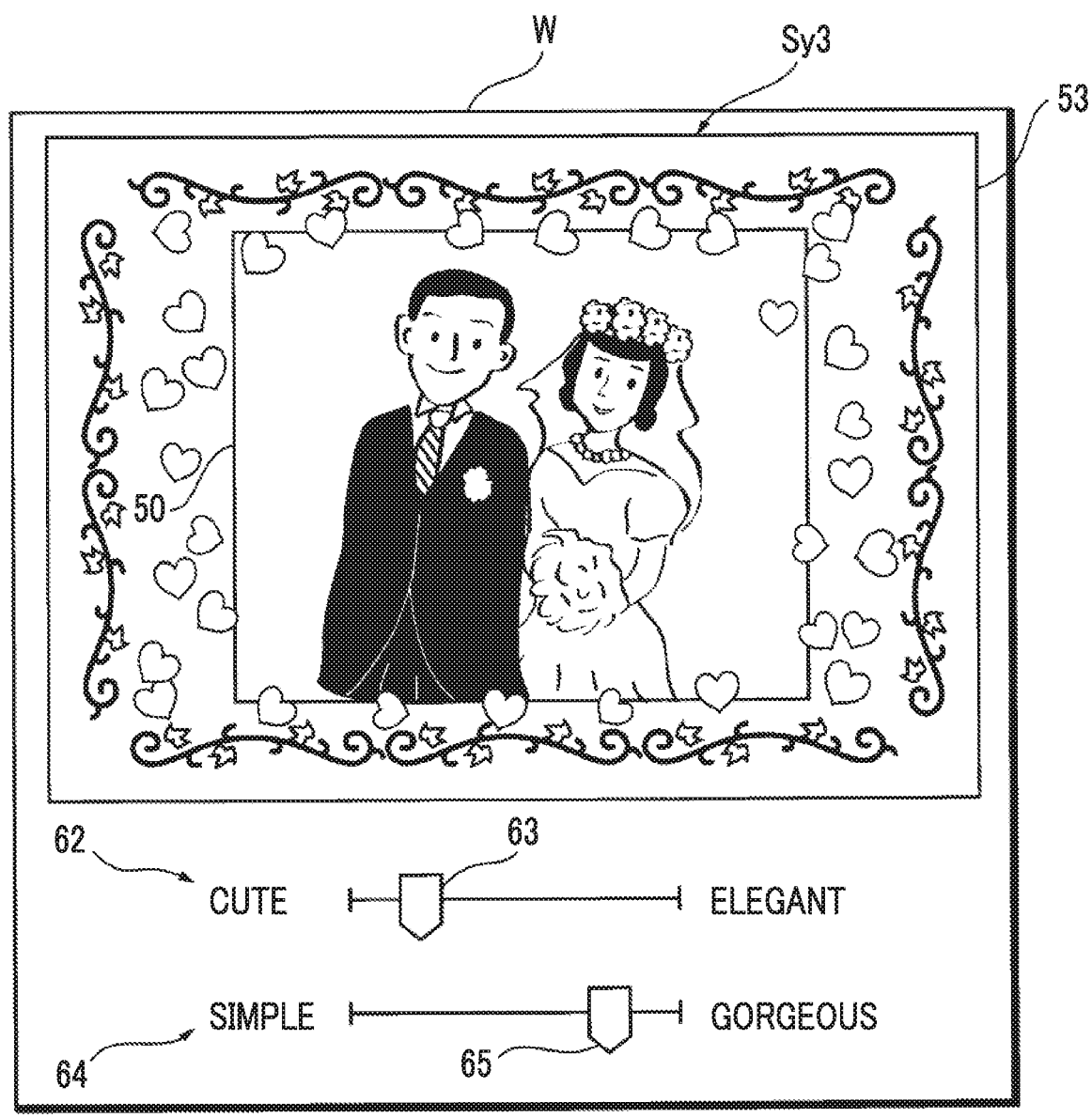
FIG. 12 is a diagram showing an example of a composite image.

FIGS. 10 to 12 are diagram showing a second embodiment.

In the first embodiment, an impression value is changed to a designated first desired impression value in a range defined by the first impression axis 41, and the second mount image 52 having the changed first desired impression value is determined, but in the second embodiment, an impression strength is changed. Changing the impression strength does not mean changing an impression value on an impression axis (first impression axis 41), but unit changing the degree of an impression.

FIG. 10 is a flowchart showing a processing procedure of the composite image generating apparatus 1, which corresponds to FIG. 3. FIG. 11 shows a part of the impression area shown in FIG. 4, which shows a three-dimensional impression area. FIG. 12 is a diagram showing an example of the window W displayed on the display screen of the display device 2.

As shown in FIG. 8, the first composite image Sy1 is generated from the first mount image 51 having the same impression value as the impression value of the composite target image 50, and the first desired impression value designating slider axis 62 is displayed (step 71). A first desired impression value is designated by the slider 63, and in a case where a desired impression value determining button (not shown) is clicked, as shown in FIG. 12, a first desired impression strength designating slider axis 64 is displayed under the first desired impression value designating slider axis 62 (step 73). A slider 65 that is moved on the first desired impression strength designating slider axis 64 is displayed on the first desired impression strength designating slider axis 64.

Referring to FIG. 11, the first desired impression value designating slider axis 62 changes an impression value defined by the first impression axis 41, but the first desired impression strength designating slider axis 64 changes an impression strength without changing the impression value defined by the first impression axis 41. For example, assuming that the impression value on the first desired impression value designating slider axis 62 is an impression value of "warm" and "cool" and an impression value of "soft" and "hard" indicated by a sign P2, the first desired impression strength designating slider axis 64 has the impression value of "warm" and "cool" and the impression value of "soft" and "hard" indicated by the sign P2, and corresponds to an impression strength axis 42 that becomes a normal of an impression area specified by a lateral axis defined by "warm" and "cool" and a longitudinal axis defined by "soft" and "hard". The impression strength axis 42 changes the impression strength from "simple" to "gorgeous", for example, without changing the impression value of "warm" and "cool" and the impression value of "soft" and "hard". In a case where the lateral axis defined by "warm" and "cool" is an X-axis and the longitudinal axis defined by "soft" and "hard" is a Y-axis, the impression strength axis 42 defined by "simple" and "gorgeous" corresponds to a Z-axis.

Referring to FIG. 12, the first desired impression strength designating slider axis 64 has both ends that are defined as "simple" and "gorgeous" so as to correspond to the impression strength axis 42. In a case where the slider 65 is moved on the first desired impression strength designating slider axis 64 using the mouse 9 (first desired impression strength designating unit), the first desired impression strength is designated in accordance with a position where the slider 65 is moved (step 74). For example, in a case where the slider 65 is moved so that an impression strength determining button (not shown) is clicked, an impression strength at a position indicated by a sign P3 on the impression strength axis 42 shown in FIG. 11 is designated as a first desired impression strength. A second mount image 53 that has the impression strength at the position indicated by the sign P3 on the impression strength axis 42 and the impression value at the position indicated by the sign P2 on the first impression axis 41 is determined by the CPU 7 (second mount image determining unit) (step 75).

The second mount image 53 determined in this way is combined with at least a partial image of the composite target image 50 using the CPU 7 (second composite image generating unit), so that the second composite image Sy2 is generated (step 76). The generated second composite image is displayed on the display screen of the display device 2 by the display control device 3 (second composite image display control unit) (step 77).

With reference to FIG. 12, since the impression strength is designated on the side of "gorgeous" using the first desired impression strength designating slider axis 64, the determined second mount image 53 has a more "gorgeous" impression than a "gorgeous" impression before the impression strength is changed. The composite target image 50 is combined with the second mount image 53, so that the second composite image Sy2 is generated.

As described above, it is possible to change an impression strength without changing an impression value on the first impression axis 41.

Third Embodiment

Figure 13:
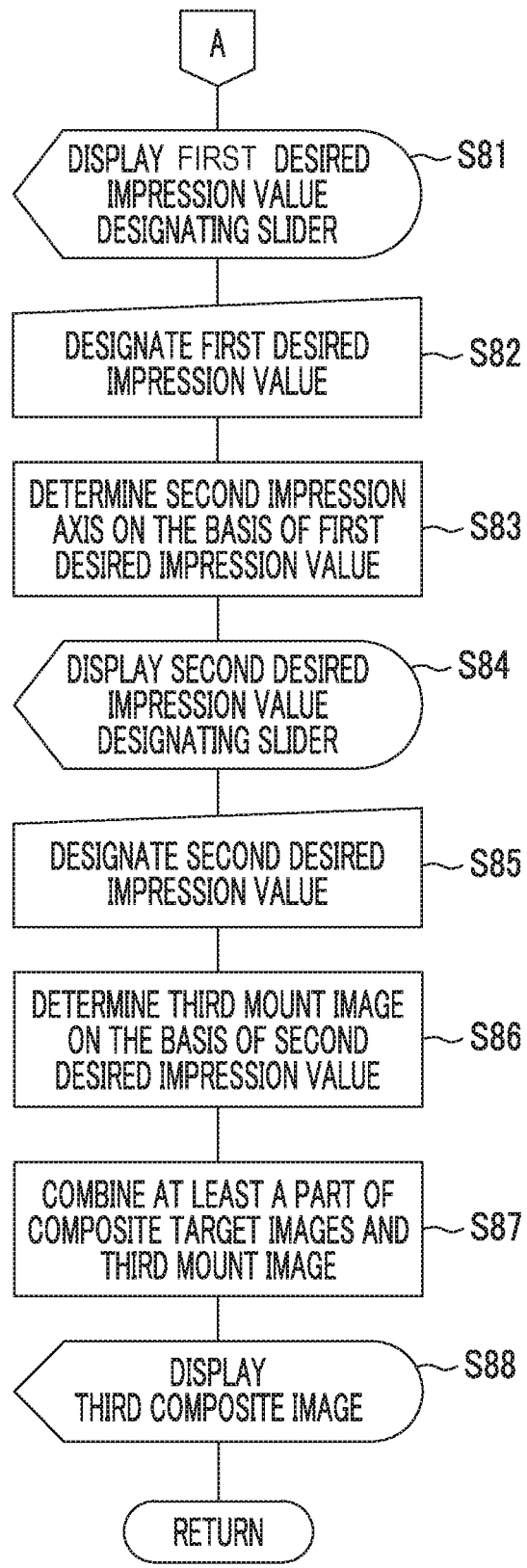
FIG. 13 is a flowchart showing a processing procedure of the composite image generating apparatus.
Figure 14:
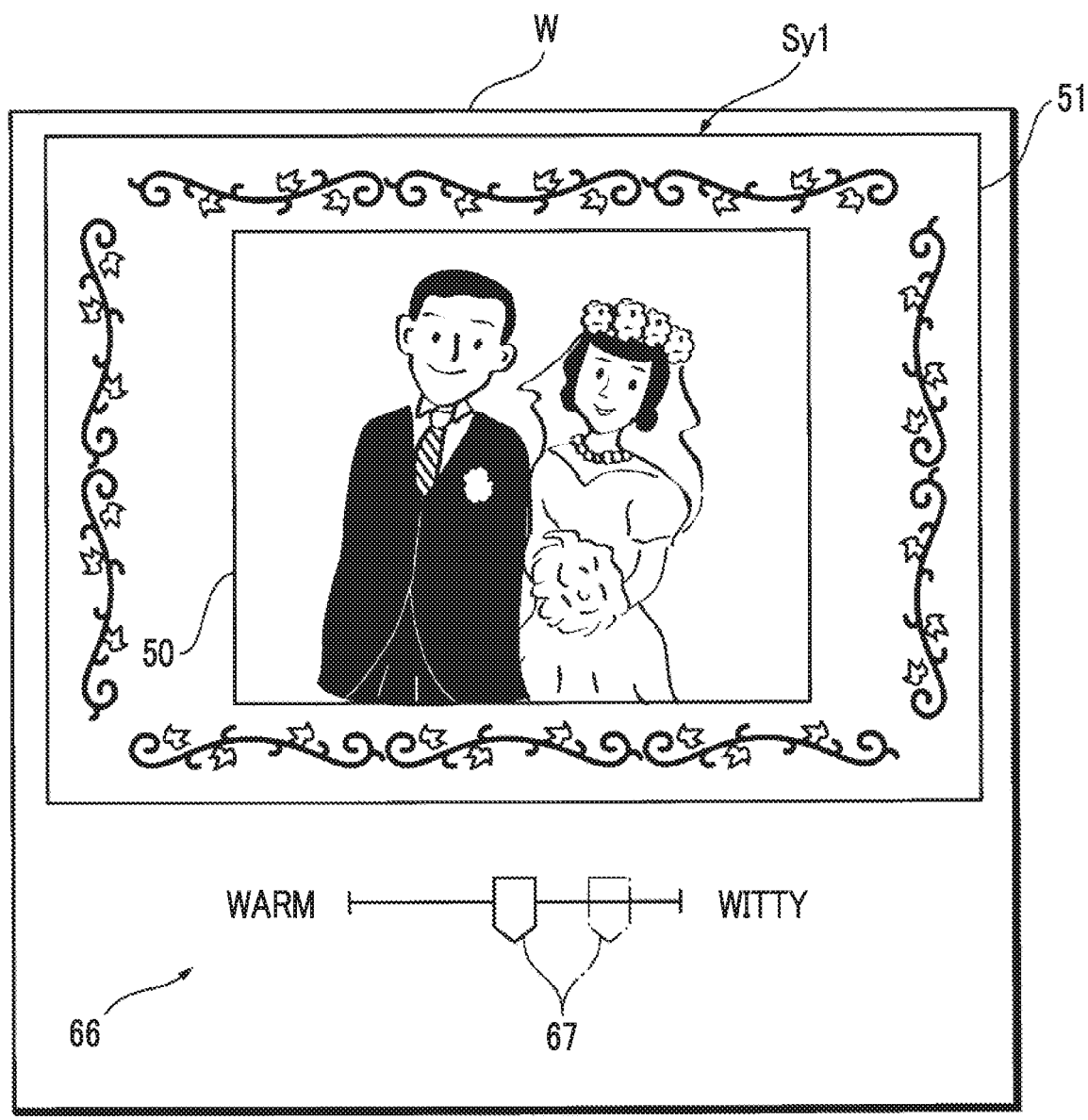
FIG. 14 is a diagram showing an example of a composite image.
Figure 15:
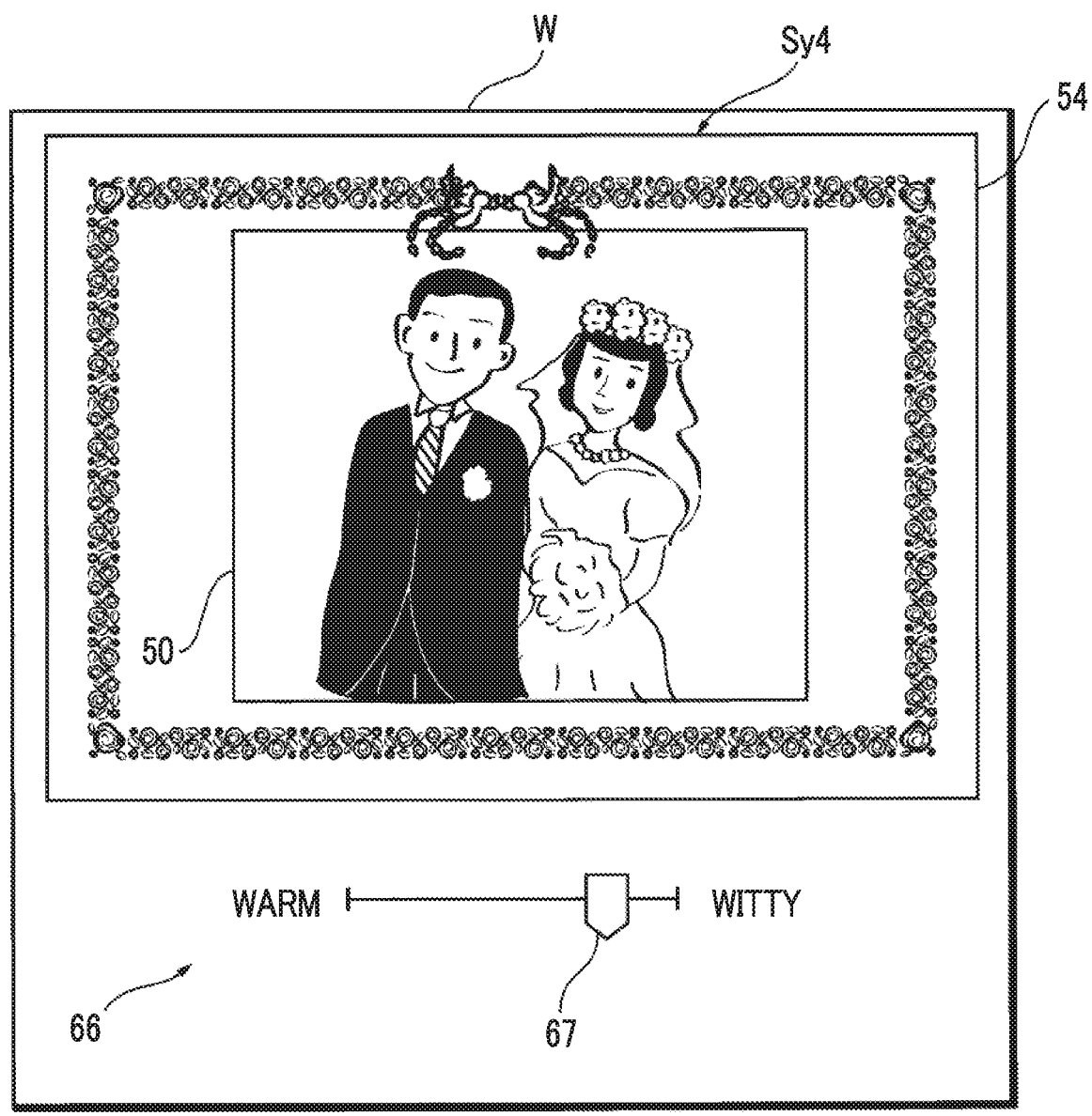
FIG. 15 is a diagram showing an example of a composite image.

FIGS. 13 to 15 are diagrams showing a third embodiment.

In the first embodiment, the impression value is changed to the designated first desired impression value in the range defined by the first impression axis 41, and the second mount image 52 having the changed first desired impression value is determined, but in the third embodiment, a second impression axis is determined on the basis of the changed first desired impression value, and an impression value can be changed in a range defined by the second impression axis.

FIG. 13 is a flowchart showing a processing procedure of the composite image generating apparatus 1, which corresponds to FIG. 3. FIGS. 14 and 15 are diagrams showing an example of a window displayed on the display screen of the display device 2, respectively.

As shown in FIG. 8, the first composite image Sy1 is generated from the first mount image 51 having the same impression value as the impression value of the composite target image 50, and the first desired impression value designating slider axis 62 is displayed (step 81). A first desired impression value is designated using the slider 63 (step 82), and for example, in a case where a desired impression value determining button (not shown) is clicked, a second impression axis is determined on the basis of the first desired impression value using the CPU 7 (second impression axis determining unit) (step 83). In a case where the slider 63 is moved on the first desired impression value designating slider axis 62 shown in FIG. 8 by a distance of a predetermined threshold or longer, the second impression value that extends in a direction of the movement is determined. For example, in a case where the slider 63 is moved in the direction of the "cute" impression or in the direction of the "elegant" impression by the distance of the threshold or longer, the second impression axis is determined. It is assumed that the slider 63 is moved in the direction of the "elegant" impression by the distance of the threshold or longer.

Referring to FIG. 4, the first desired impression value designating slider axis 62 corresponds to the first impression axis 41. The movement of the slider 63 in the direction of the "elegant" means that the user prefers a mount image of a more "elegant" impression. Since the first impression axis 41 defines a range of an impression of "cute" and "elegant" in FIG. 4, the end point PS1 represents "cute", and the end point PE1 represents "elegant", in order to designate a more "elegant" impression, a second impression axis 43 that is beyond the end point PE1 in the direction from the end point PS1 to the end point PE1 and is on the extension of the first impression axis 41 may be defined. The second impression axis 43 defined by the end point PS2 and the end point PE2 in this way is determined using the CPU 7 (second impression axis determining unit). It is preferable that the length of the second impression axis 43 is the same as the length of the first impression axis 41, but both the lengths may not be the same. Since an end point PS2 of the second impression axis 43 corresponds to a sensibility word "warm" distributed in the impression area in FIG. 5 and the end point PE2 of the second impression axis 43 corresponds to a sensibility word "witty" distributed in the impression area of FIG. 5, a second desired impression value designating slider axis 66 that defines a "warm" impression and a "witty" impression, instead of the first desired impression value designating slider axis 62, is displayed on the window W as shown in FIG. 14 (step 84).

The user moves a slider 67 on the second desired impression value designating slider axis 66 using the mouse 9 (second desired impression value designating unit) to a desired position to thereby designate the second desired impression value (step 85). In a case where a desired impression value determining button (not shown) is clicked, a third mount image having an impression value corresponding to the position of the slider 67 is determined by the CPU 7 (third mount image determining unit) (step 86). For example, in FIG. 14, it is assumed that the slider 67 is moved to a dotted chain line position. The dashed line position corresponds to a position of a sign P4 on the second impression axis 43 in FIG. 4 (in which the second impression axis 43 corresponds to the second desired impression value designating slider axis 66). Since the position of the sign P4 corresponds to "elegant" among the sensibility words distributed in the impression area shown in FIG. 5, the mount image 51 having an "elegant" impression is determined as the third mount image 54 using the CPU 7. In a case where the third mount image 54 is determined in this way, as shown in FIG. 15, the determined third mount image 54 is combined with the composite target image 50 using the CPU 7 (third composite image generating unit), so that a third composite image Sy4 is generated (step 87). The generated third composite image Sy4 is displayed on the display screen of the display device 2 by the display control device 3 (third composite image display control unit) (step 88).

The third mount image 54 has a more "elegant" image than that of the first mount image 51, and has a "witty" impression.

According to the third embodiment, it is possible to determine a mount image having an impression that exceeds the impression in the range defined by the first impression axis 41.

Fourth Embodiment

Figure 16:
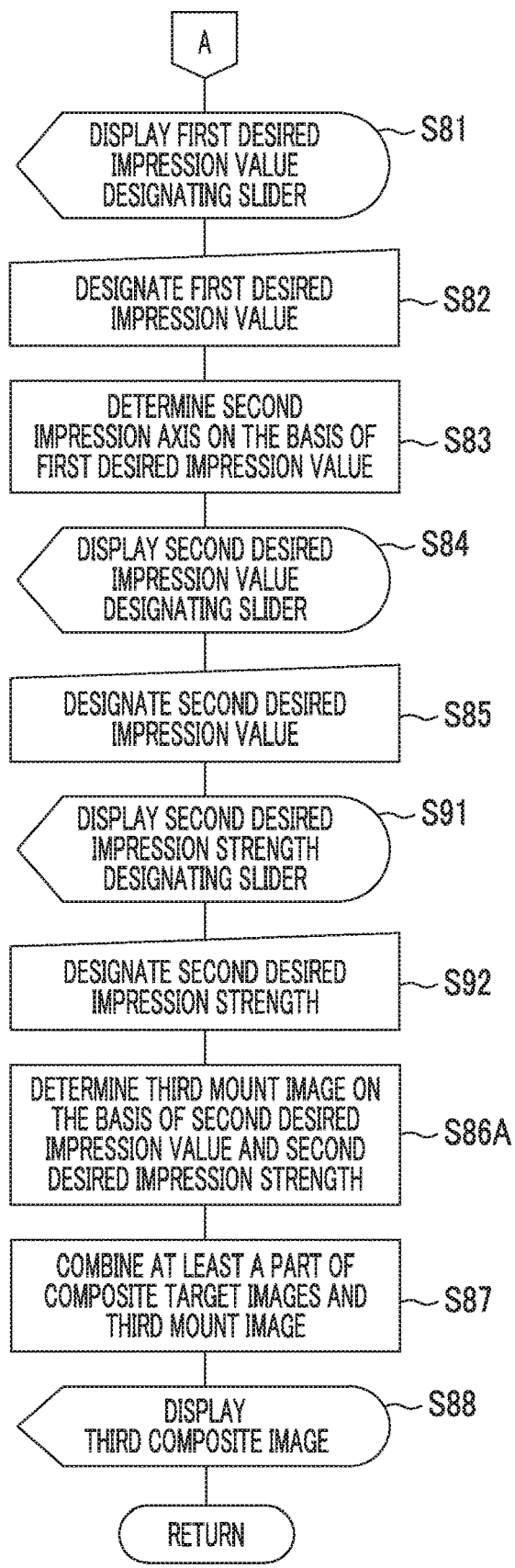
FIG. 16 is a flowchart showing a processing procedure of the composite image generating apparatus.
Figure 17:
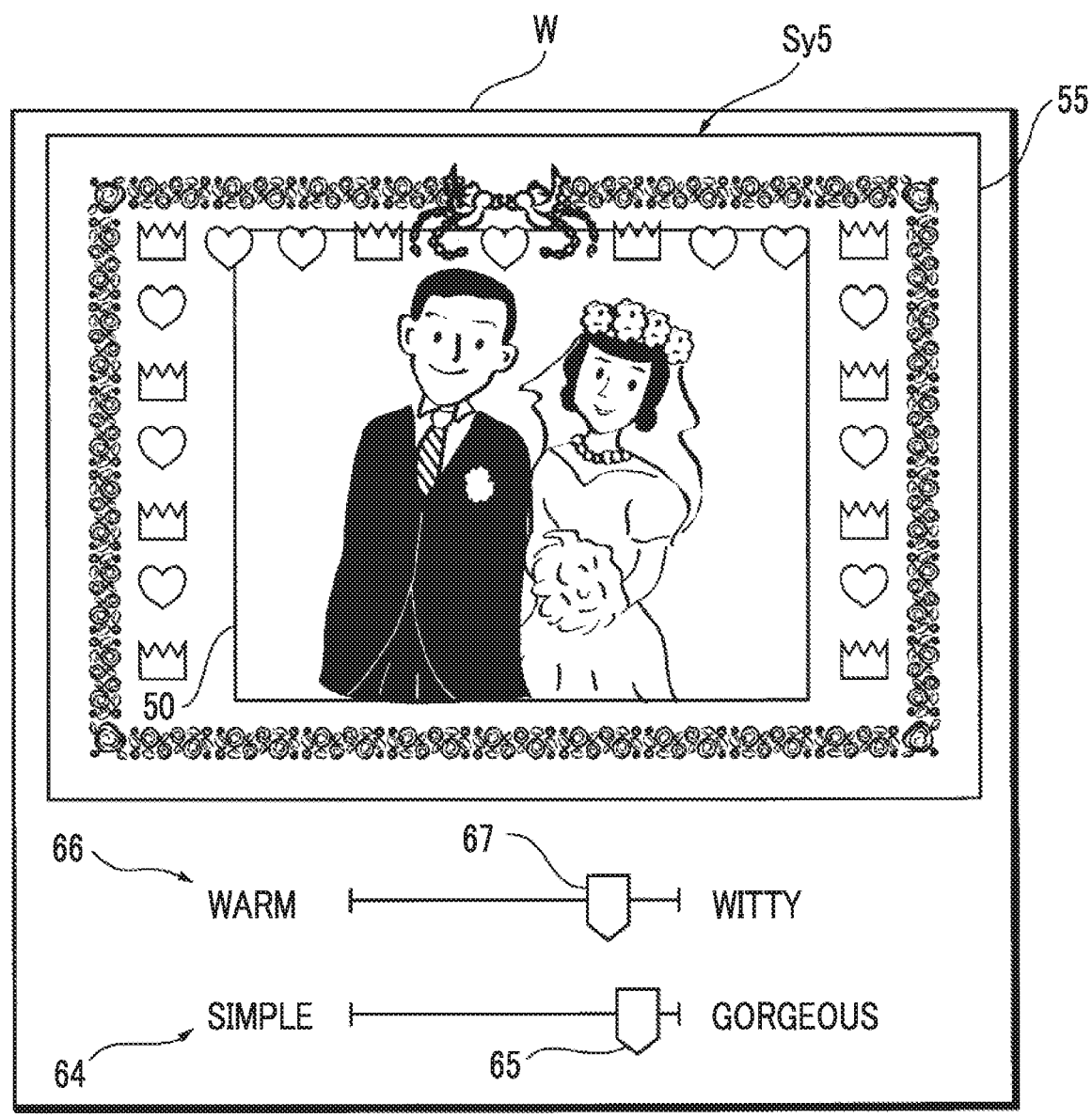
FIG. 17 is a diagram showing an example of a composite image.

FIGS. 16 and 17 are diagrams showing a fourth embodiment.

In the fourth embodiment, the second impression axis 43 is determined, as shown in the third embodiment, and an impression strength is changed in a predetermined impression value on the second impression axis 43 as shown in the second embodiment.

FIG. 16 is a flowchart showing a processing procedure of the composite image generating apparatus 1. FIG. 16 corresponds to FIG. 13. Thus, the same reference numerals are given to the same processes as the processes shown in FIG. 13, and description thereof will not be repeated. FIG. 17 is a diagram showing an example of a composite image displayed on the display screen of the display device 2.

In a case where the slider 63 of the first desired impression value designating slider axis 62 (see FIG. 8 or the like) is moved by a distance of a predetermined threshold or longer, as shown in FIG. 17, the second desired impression value designating slider axis 66, instead of the first desired impression value designating slider axis 62, is displayed. In a case where the slider 67 is moved on the second desired impression value designating slider axis 66 to a desired position and a desired impression value determining button (not shown) is clicked, the first desired impression strength designating slider axis 64 for changing an impression strength without changing an impression value defined by the slider 67 that is moved on the second desired impression value designating slider axis 66 is displayed by the display control device 3 (step 91). The user moves the slider 65 to a desired position using the mouse 9 (second desired impression strength designating unit) on the first desired impression strength designating slider axis 64, to thereby designate a desired impression strength (step 92).

In a case where a desired impression strength determining button (not shown) is clicked, a third mount image 55 is determined by the CPU 7 (third mount image determining unit) on the basis of the desired impression value designated using the second desired impression value designating slider axis 66 and the desired impression strength designated using the first desired impression strength designating slider axis 64 (step 86A). The composite target image 50 is combined with the determined third mount image 55, so that a third composite image Sy5 is displayed on the display screen of the display device 2 (step 88).

The third composite image Sy5 shows an "witty" impression so as to have the desired impression value designated using the second desired impression value designating slider axis 66, and shows a "gorgeous" impression to have the desired impression strength designated using the first desired impression strength designating slider axis 64.

According to the fourth embodiment, it is possible to determine a mount image having an impression that is beyond a range of the first impression axis and having a desired impression strength.

Fifth Embodiment

Figure 18:
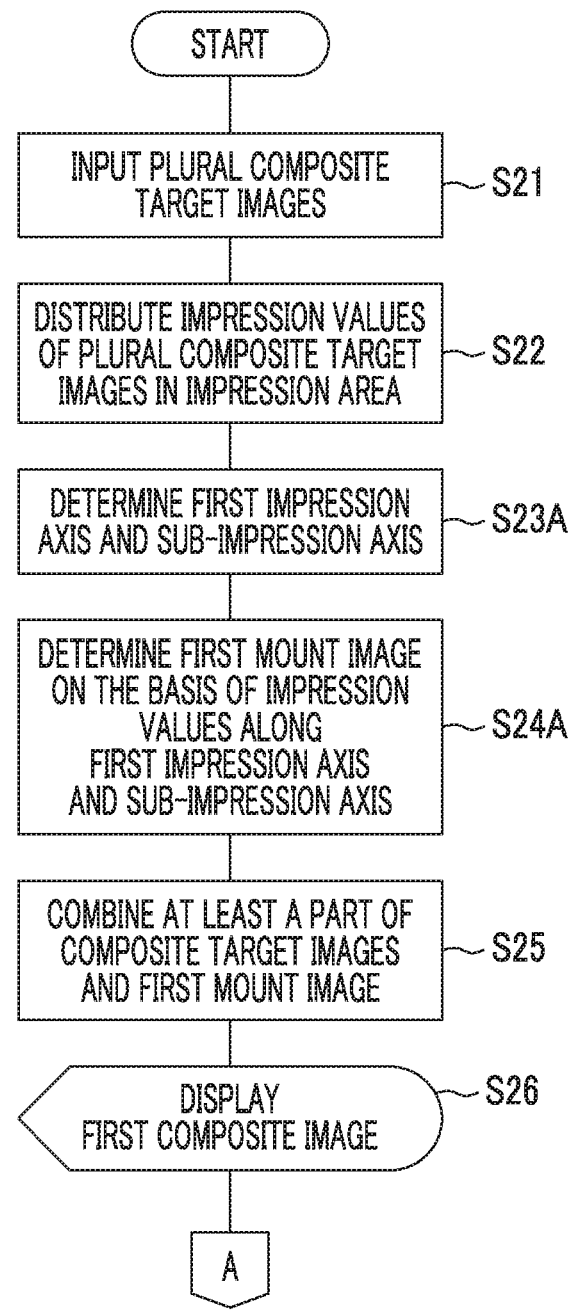
FIG. 18 is a flowchart showing a processing procedure of the composite image generating apparatus.
Figure 19:
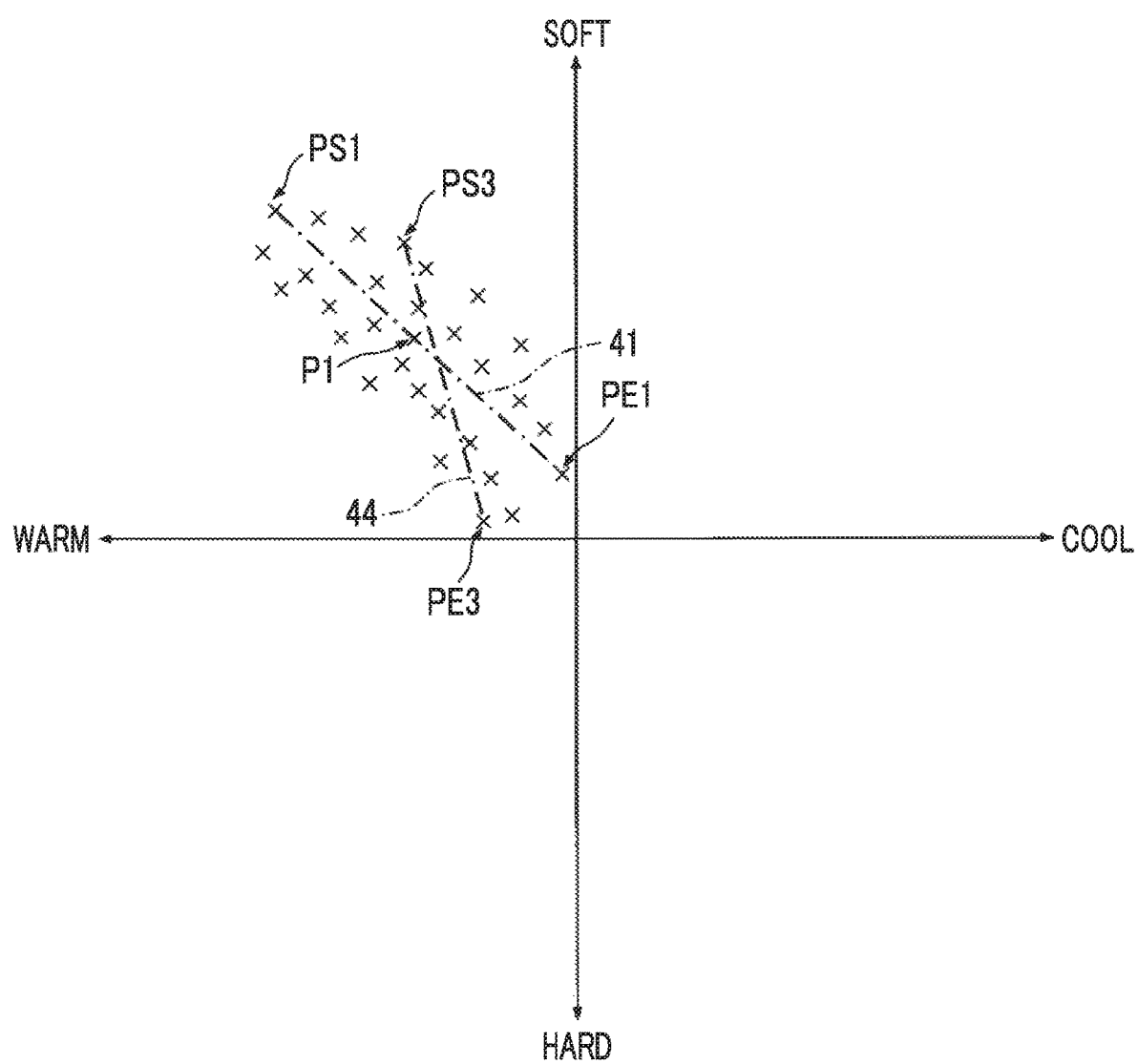
FIG. 19 is a diagram showing an example of an impression area.
Figure 20:
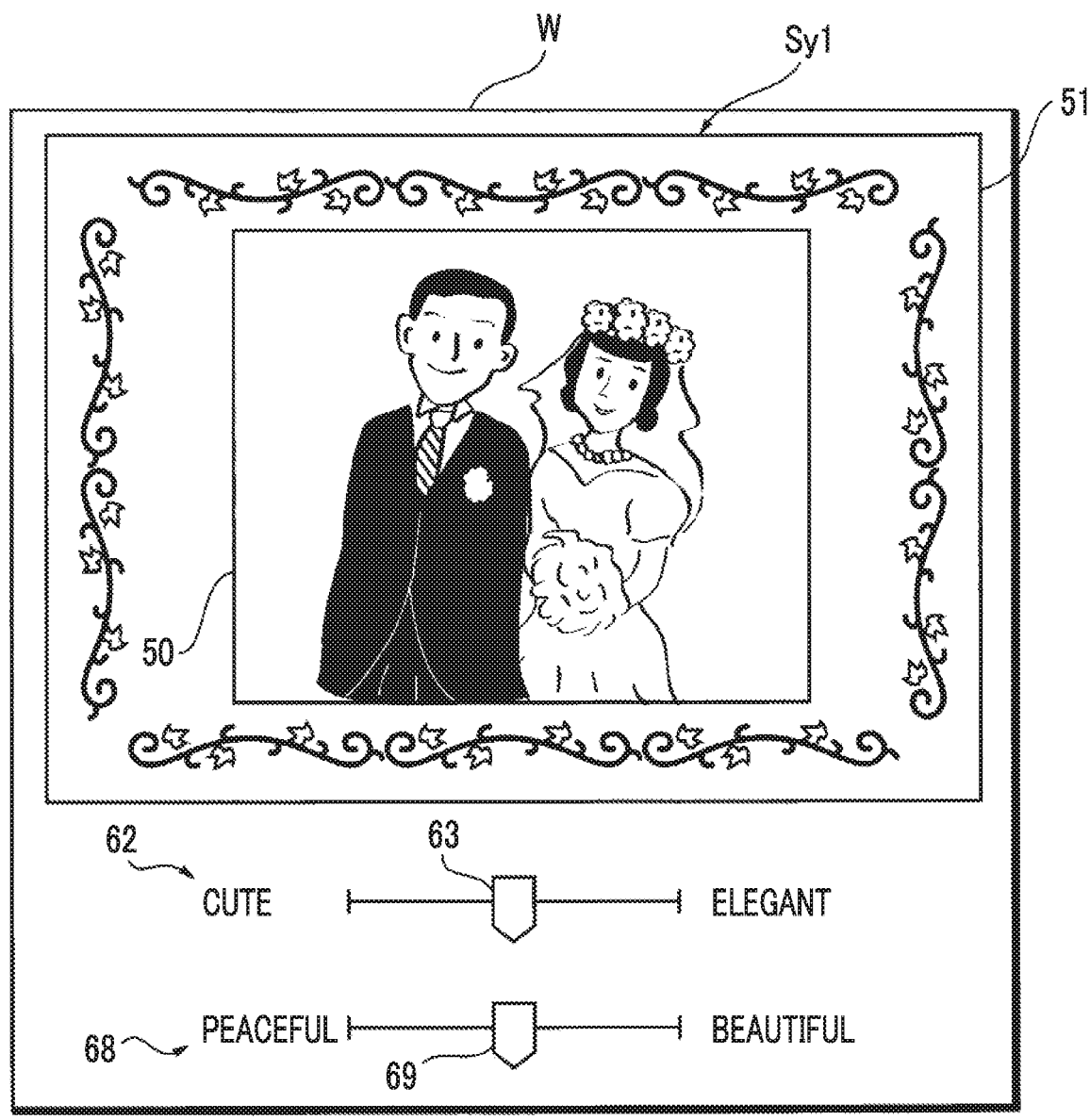
FIG. 20 is a diagram showing an example of a composite image.

FIGS. 18 to 20 are diagrams showing a fifth embodiment.

In the fifth embodiment, a first mount image is determined along a plurality of impression axes (first impression axes).

FIG. 18 is a flowchart showing a processing procedure of the composite image generating apparatus 1. In FIG. 18, the same reference numerals as shown in FIG. 2 are given to processes corresponding to the processes in FIG. 2, and description thereof will not be repeated. FIG. 19 corresponds to FIG. 4, and shows an example of an impression area in which impression values of a plurality of images are distributed. FIG. 20 is a diagram showing an example of a composite image displayed on the display screen of the display device 2.

As shown in FIG. 19, impression values of a plurality of composite target images are distributed in the impression area (step 22 in FIG. 18). An axis on which a dispersion of the impression values distributed in the impression area becomes the maximum is determined by the first impression axis 41 (main impression axis) and the CPU 7 as described above, and an axis on which the dispersion of the impression values becomes the second maximum is determined by the sub-impression axis 44 and the CPU 7 (step 23A in FIG. 18). The axis on which the dispersion of the impression values becomes the second maximum may be set as an axis on which a dispersion of impression values becomes the maximum among impressions obtained by excluding a predetermined number of impression values that are present in both end portions of in a direction of the axis on which the dispersion of the impression values becomes the maximum.

A mount image having an impression value close to an impression value of the composite target image 50 on the first impression axis 41 and an impression value of the composite target image on the sub-impression axis 44 is determined by the CPU 7 as a first mount image (step 24A). An intersection line with a perpendicular line that extends from an impression value P1 of the composite target image 50 to the first impression axis 41 becomes the impression value of the composite target image 50 on the first impression axis 41, and an intersection line with a perpendicular line that extends from the impression value P1 of the composite target image 50 to the sub-impression axis 44 becomes the impression value of the composite target image on the sub-impression axis 44. The first mount image determined in this way is combined with the composite target image 50.

In the above-described embodiment, the axis on which the dispersion of the impression values distributed in the impression area becomes the maximum is set as the first impression axis 41 (main impression axis) and the axis on which the dispersion of the impression values becomes the second maximum is set as the sub-impression axis 44, and the two impression axes are used, but the axis on which the dispersion of the impression values become maximum and the axis on which the dispersion of the impression values becomes the second maximum may not be used. The first mount image may be determined using impression values obtained from the plurality of impression axes (first impression axes).

In this way, in a case where the plurality of impression axes are assumed, the first desired impression value designating slider axis 62 and the third desired impression value designating slider axis 68, corresponding to the plurality of impression axes, are also displayed on the window W displayed on the display screen of the display device 2. The first desired impression value designating slider axis 62 corresponds to the first impression axis 41, and the slider 63 that designates a desired impression value is formed on the first desired impression value designating slider axis 62. The third desired impression value designating slider axis 68 corresponds to the sub-impression axis 44, and the slider 69 that designates a desired impression value is also formed on the third desired impression value designating slider axis 68. In this way, in a case where two desired impression value designating slider axes 62 and 68 are provided, the desired impression value is designated by moving the slider 63 to a desired position on the first desired impression value designating slider axis 62 corresponding to the first impression axis 41 that is the main impression axis, so that the sub-impression axis that passes through the designated desired impression value may be determined. For example, in a case where it is assumed that a position where the slider 63 is moved corresponds to a position indicated by the sign P1 in the impression area shown in FIG. 19, an impression axis that is different from the first impression axis 41 and passes through the position indicated by the sign P1 is determined as the sub-impression axis. A desired impression value designating slider axis corresponding to the sub-impression axis determined in this way becomes the second desired impression value designating slider axis.

According to the fifth embodiment, it is possible to determine the first mount image using a plurality of impression axes.

Sixth Embodiment

FIGS. 21 to 25 are diagrams showing a sixth embodiment.

In the sixth embodiment, determination of a design parameter for setting disposition of a composite target image and determination of a background image correspond to determination of a first mount image.

Figure 21:
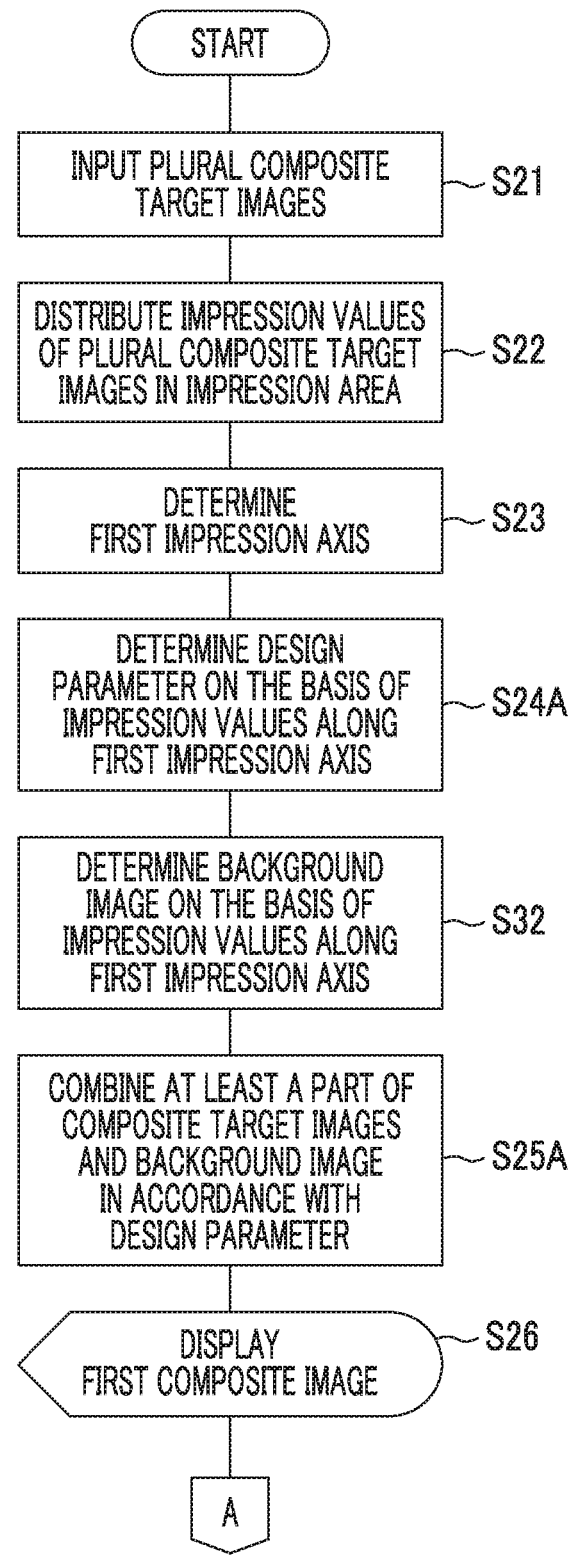
FIG. 21 is a flowchart showing a processing procedure of the composite image generating apparatus.

FIG. 21 is a flowchart showing a processing procedure of the composite image generating apparatus 1. FIG. 21 corresponds to FIG. 2. Thus, the same reference numerals are given to the same processes as in the processes shown in FIG. 2, and description thereof will not be repeated.

In this embodiment, one postcard is generated from five images.

Figure 22:
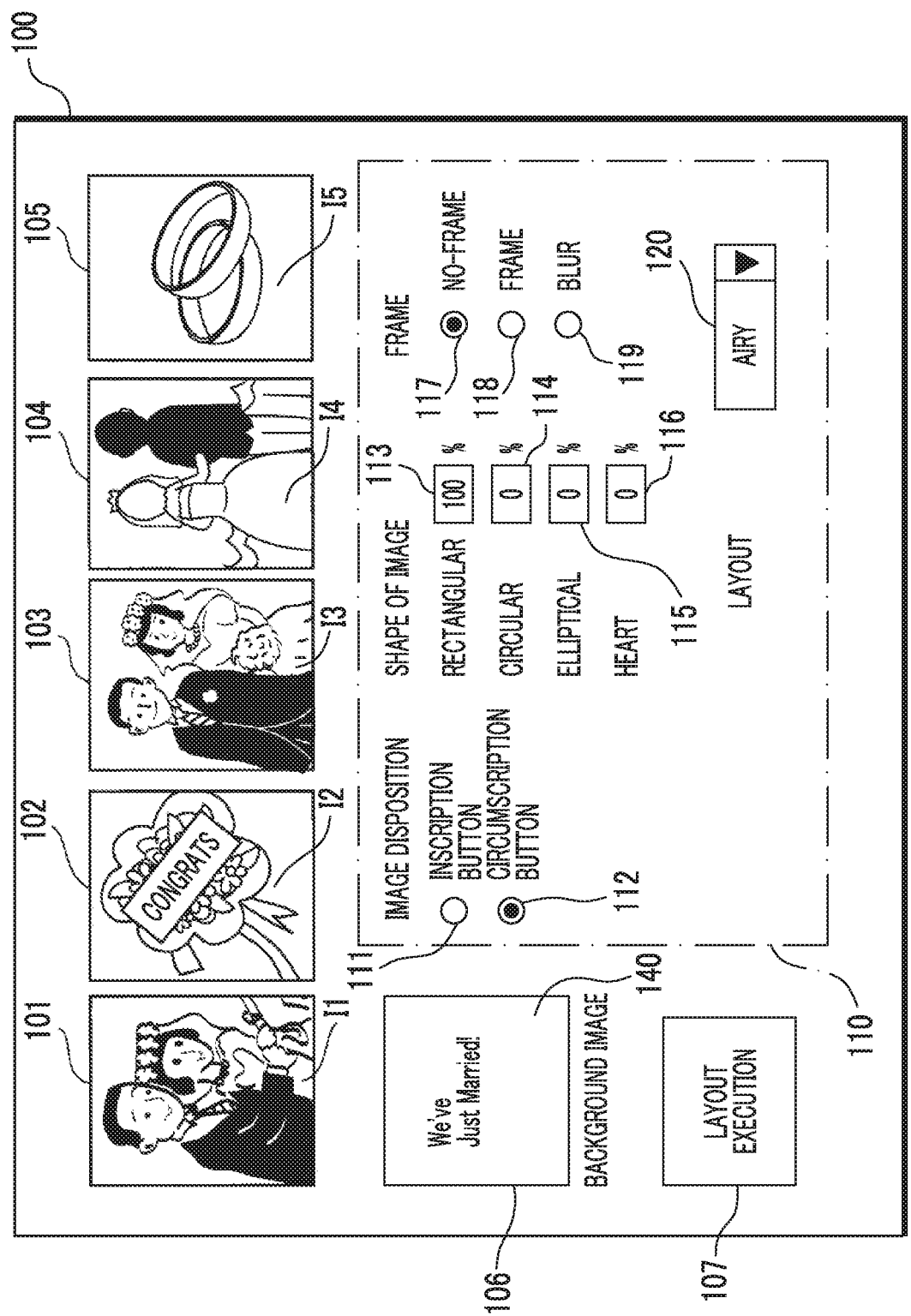
FIG. 22 is a diagram showing an example of a design window.

As described above, a plurality of composite target images are input to the composite image generating apparatus 1, and the first impression axis 41 is determined (steps 21 to 23). Five composite target images I1 to I5 (see FIG. 22) for generating a postcard are designated by a user. Then, a design window 100 shown in FIG. 22 is displayed on the display screen of the display device 2.

The design window 100 includes image display areas 101 to 105 in which the composite target images I1 to I5 for generating the postcard are displayed, a background image display area 106 in which a background image 140 of the postcard is displayed, a layout executing button 107, and a design setting area 110. The design setting area 110 includes an inscription button 111 that is selected in a case where disposition of images in the postcard is inscribed in a disposition area, a circumscription button 112 that is selected in a case where disposition of images in the postcard is circumscribed in the disposition area, an area 113 for designating a percentage at which the shapes of images are formed to be rectangular, an area 114 for designating a percentage at which the shapes of images are formed to be circular, an area 115 for designating a percentage at which the shapes of images are formed to be elliptical, an area 116 for designating a percentage at which the shapes of images are formed to be a heart, a no-frame button 117 selected in a case where a frame is not provided to a disposition area, a frame button 118 selected in a case where a frame is provided to a disposition area, a frame blur button 119 selected in a case where a border between an image and a disposition area is blurred, and a layout name display area 120 where a layout name is displayed. The layout name displayed in the layout name display area 120 represents a layout corresponding to a determined design parameter.

In this embodiment, for example, it is assumed that impression values along the first impression axis of the five images I1 to I5 are determined to correspond to impressions of the sensibility word "warm". Then, a design parameter (layout name) corresponding to the "warm" impressions is determined. For example, it is assumed that "airy" is determined as the design parameter. In this way, on the basis of impression values of the respective composite target images I1 to I5 on the first impression axis 41, design parameters of the postcard for setting disposition of the composite target images I1 to I5 are determined by the CPU 7 (design parameter determining unit) (step 24A).

Figure 23:
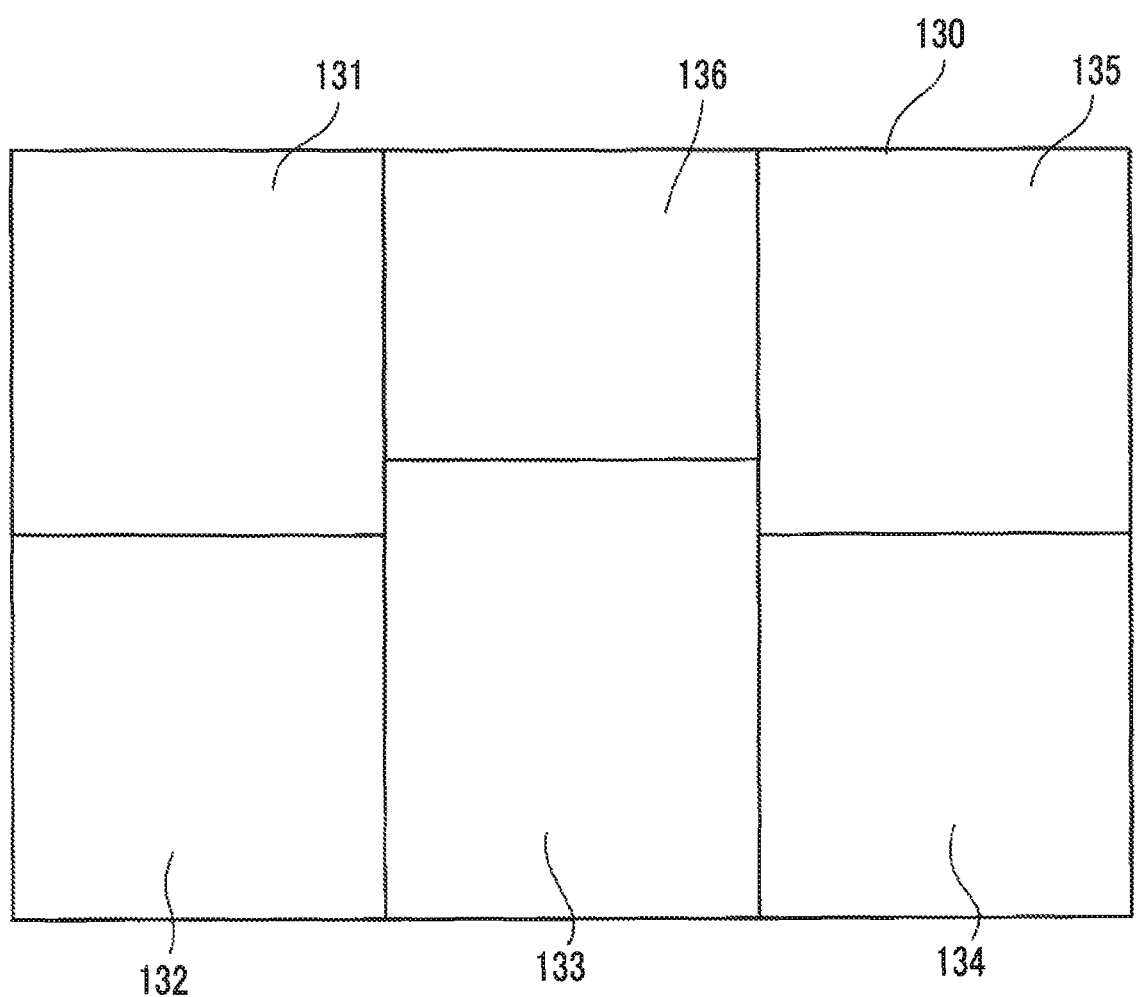
FIG. 23 is a diagram showing an example of a layout image.

FIG. 23 is a diagram showing an example of a layout image defined by "airy".

In the layout image 130, image disposition areas 131 to 136 are defined. Certain images among the images I1 to I5 are disposed in certain areas among the image disposition areas 131 to 136. A questionnaire survey or the like is performed in advance with respect to multiple users, and data indicating which layout corresponds to each impression is stored in the hard disk 12 of the composite image generating apparatus 1. It is determined that the layout image 130 has the "warm" impression through the questionnaire survey or the like. With respect to a different impression, the layout image 130 of a layout corresponding to the impression is determined in advance. Layout images other than the layout image 130 are also stored in the hard disk 12 in advance.

Subsequently, a background image corresponding to the impression values along the first impression axis of the five images I1 to I5 is determined by the CPU 7 (background image determining unit) (step 32).

Figure 24:
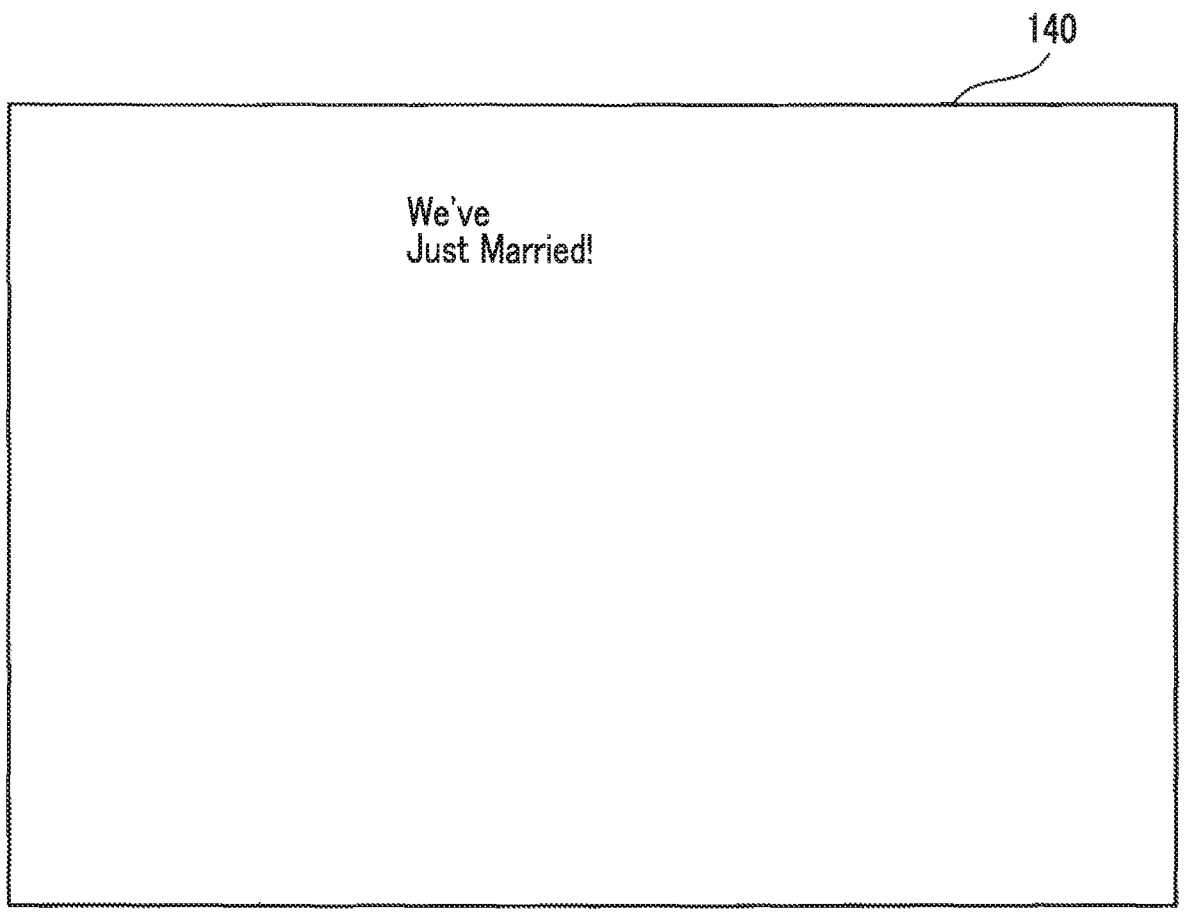
FIG. 24 is a diagram showing an example of a background image.

FIG. 24 is a diagram showing an example of the determined background image.

Similar to the layout image, a background image 140 shown in FIG. 24 shows multiple background images to a user, impressions of the respective background images are stored in advance, and a background image corresponding to a determined impression is determined by the CPU 7. The user determines that the background image 140 shown in FIG. 24 has a "warm" impression.

The determined background image is displayed in the background image display area 106 shown in FIG. 22.

In a case where the design parameter (layout image 130) and the background image 140 are determined, at least a part of the respective composite target images I1 to I5 is combined with the background image in accordance with the design parameter (step 25A), so that the first composite image is generated (step 26). The generated first composite image is displayed on the display screen of the display device 2.

Figure 25:
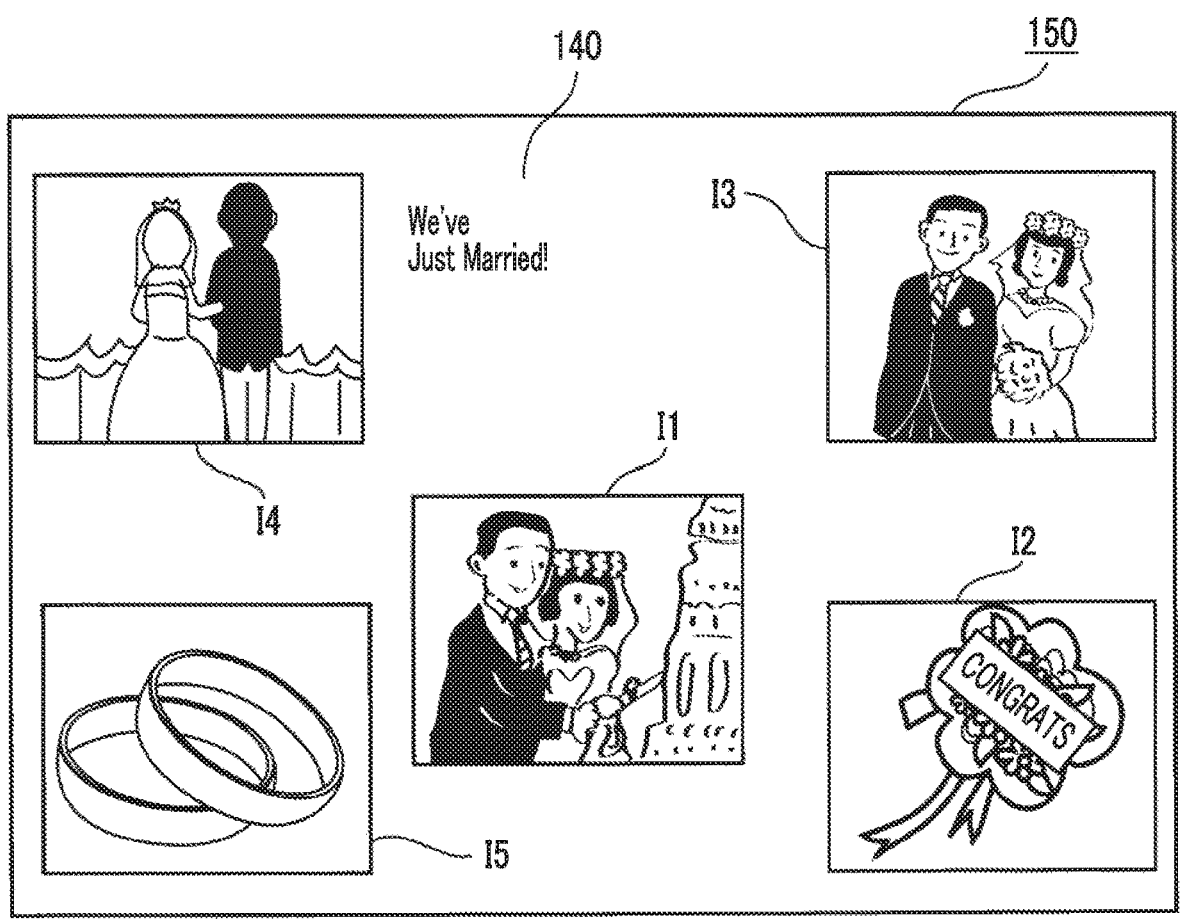
FIG. 25 is a diagram showing an example of a composite image.

FIG. 25 is a diagram showing an example of the first composite image 150.

The image I4 is disposed in the image disposition area 131 of the layout image 130, the image I5 is disposed in the image disposition area 132, the image I1 is disposed in the image disposition area 133, the image I2 is disposed in the image disposition area 134, and the image I3 is disposed in the image disposition area 135, respectively. There is no image in the image disposition area 136.

In this way, the design parameter is determined in accordance with the impressions of the images I1 to I5, and the background image is also determined. In the above-described embodiment, the layout image 130 is used to correspond to the design parameter, but it is not essential that the layout image 130 is used as long as a parameter for determining disposition of the images I1 to I5 is present.

Further, in the above-described embodiments, as shown in FIG. 5, an impression area in which sensibility words are distributed is used, but it is not essential that the impression area in which the sensibility words is distributed is used, and it is sufficient if a user can know that positions of impression values of composite target images in an impression area defined by a lateral axis of "warm" and "cool" (not limited to "warm" and "cool"), a longitudinal axis of "soft" and "hard" (not limited to "soft" and "hard"), or the like. Further, the impression area shown in FIG. 5 may be divided into a plurality of blocks such as 16 or 25 blocks, an impressions in the same block may be considered to have the same impression, and then, the above-described processes may be performed.

In the above-described processes, a processing unit that executes the processes such as the determination of the first mount image includes the CPU 7 that functions as a variety of processing units by executing software, a programmable logic device capable of changing a circuit configuration after manufacturing, such as a field-programmable gate array (FPGA), a dedicated electric circuit that is a processor having a circuit configuration that is dedicatedly designed for executing a specific process, such as an application specific integrated circuit (ASIC), or the like.

One processing unit may be configured of one among the variety of processors, or may be configured of a combination of two or more same or different processors (for example, a combination of a plurality of FPGAs, or a combination of CPU and FPGA). As an example in which a plurality of processing units form one processor, first, a configuration in which a combination of one or more CPUs and software form one processor so that the processor functions as a plurality of processing units, as represented as a computer such as a client computer or a server, may be used. Second, a configuration in which a processor that realizes entire functions of a system including a plurality of processing units by one integrated circuit (IC) chip, as represented as a system-on-chip or the like, may be used. As described above, the variety of processing units may be configured by using one or more various processors as a hardware structure.

Further, more specifically, the hardware structure of the various processors is an electric circuit in which circuit elements such as semiconductor elements are combined.

In the above-described embodiments, the composite image generating apparatus 1 has been described like a dedicated device. However, the composite image generating apparatus 1 may not be the dedicated device, but instead, may be configured by a personal computer, may be configured of a so-called smart device such as a smartphone or a tablet device, or may be configured of a mobile phone such as a feature phone.

EXPLANATION OF REFERENCES

1: composite image generating apparatus
2: display device
3: display control device
4: memory
5: compact disc
6: CD drive
7: CPU
8: keyboard
9: mouse
10: communication device
11: HD drive
12: HD
13: memory card interface
14: memory card
41: first impression axis
42: impression strength axis
43: second impression axis
44: sub-impression axis
50: composite target image
51: first mount image
52: second mount image
53: second mount image
54: third mount image
55: third mount image
62: first desired impression value designating slider axis
63: slider
64: first desired impression strength designating slider axis
65: slider
66: second desired impression value designating slider axis
67: slider
68: third desired impression value designating slider axis
69: slider
100: design window
101: image display area
106: background image display area
107: layout executing button
110: design setting area
111: inscription button
112: circumscription button
113: area
114: area
115: area
116: area
117: no-frame button
118: frame button
119: frame blur button
120: layout name display area
130: layout image
131: image disposition area
132: image disposition area
133: image disposition area 134: image disposition area
135: image disposition area
136: image disposition area
140: background image
150: first composite image
I1: image
I2: image
I3: image
I4: image
I5: image
P1: impression value
PE1: end point
PE2: end point
PS1: end point
PS2: end point
Sy1: first composite image
Sy2: second composite image
Sy4: third composite image
Sy5: third composite image
W: window

What is claimed is:

1. A composite image generating apparatus comprising:
a processor circuit configured to:
input a composite target image;
determine a first mount image on the basis of an impression value along a first impression axis, with respect to the composite target image;
combine at least a part of the composite target image and the first mount image to generate a first composite image;
display the first composite image;
designate a first desired impression value on the first impression axis;
determine a second mount image on the basis of the first desired impression value;
generate a second composite image by combining at least a part of the composite target image and the second mount image; and
display the second composite image,
wherein the processor circuit is further configured to:
input a plurality of composite target images;
distribute impression values of the plurality of composite target images in an impression area defined by at least two impression axes; and
determine a particular axis on which a dispersion of the impression values distributed in the impression area becomes the maximum, as the first impression axis.

2. The composite image generating apparatus according to claim 1,
wherein the processor circuit is further configured to determine the particular axis on which the dispersion of the impression values distributed in the impression area becomes the maximum, among a plurality of impression axes that are determined in advance, as the first impression axis.

3. The composite image generating apparatus according to claim 1,
wherein the processor circuit is further configured to designate a first desired impression strength, and
wherein the processor circuit is configured to determine the second mount image on the basis of the first desired impression value and the first desired impression strength.

4. The composite image generating apparatus according to claim 2,
wherein the processor circuit is further configured to designate a first desired impression strength, and
wherein the processor circuit is configured to determine the second mount image on the basis of the first desired impression value and the first desired impression strength.

5. The composite image generating apparatus according to claim 1,
wherein the processor circuit is further configured to:
determine a second impression axis on the basis of the first desired impression value;
designate a second desired impression value on the second impression axis;
determine a third mount image on the basis of the second desired impression value;
generate a third composite image by combining at least a part of the composite target image and the third mount image; and
display the third composite image.

6. The composite image generating apparatus according to claim 2,
wherein the processor circuit is further configured to:
determine a second impression axis on the basis of the first desired impression value;
designate a second desired impression value on the second impression axis;
determine a third mount image on the basis of the second desired impression value;
generate a third composite image by combining at least a part of the composite target image and the third mount image; and
display the third composite image.

7. The composite image generating apparatus according to claim 5,
wherein the processor circuit is further configured to designate a second desired impression strength, and
wherein the processor circuit is configured to determine the third mount image on the basis of the second desired impression value and the second desired impression strength.

8. The composite image generating apparatus according to claim 1,
wherein the processor circuit is configured to determine the first mount image on the basis of the impression values along a plurality of first impression axes with respect to the composite target image.

9. The composite image generating apparatus according to claim 1,
wherein the first impression axis includes a main impression axis and a sub-impression axis, and
wherein the processor circuit is configured to:
determine the particular axis on which the dispersion of the impression values distributed in the impression area becomes the maximum as the main impression axis;
determine another axis on which the dispersion becomes the second maximum as the sub-impression axis; and
determine the first mount image on the basis of the impression values along the main impression axis and the sub-impression axis with respect to the composite target image.

10. The composite image generating apparatus according to claim 1,
wherein the first impression axis includes a main impression axis and a sub-impression axis, and wherein the processor circuit is configured to:
  determine the particular axis on which the dispersion of the impression values distributed in the impression area becomes the maximum as the main impression axis;
  designate the first desired impression value on the main impression axis;
  determine another axis that passes through the designated first desired impression value and is different from the main impression axis as the sub-impression axis; and
  determine the first mount image on the basis of the impression values along the main impression axis and the sub-impression axis with respect to the composite target image.

11. The composite image generating apparatus according to claim 1,
  wherein the processor circuit is further configured to:
    determine a design parameter for setting disposition of the composite target image in the first mount image on the basis of the impression values along the first impression axis with respect to the composite target image; and
    determine a background image on the basis of the impression values along on the first impression axis with respect to the composite target image, and
  wherein the determination of the design parameter and the determination of the background image correspond to the determination of the first mount image.

12. A composite image generating method comprising:
  inputting a composite target image;
  determining a first mount image on the basis of an impression value along a first impression axis, with respect to the composite target image;
  generating a first composite image by combining at least a part of the composite target image and the first mount image;
  displaying the first composite image;
  designating a first desired impression value on the first impression axis;
  determining a second mount image on the basis of the first desired impression value;
  generating a second composite image by combining at least a part of the composite target image and the second mount image; and
  displaying the second composite image,
  wherein the method further comprises:
    inputting a plurality of composite target images;
    distributing impression values of the plurality of composite target images in an impression area defined by at least two impression axes; and
    determining a particular axis on which a dispersion of the impression values distributed in the impression area becomes the maximum, as the first impression axis.

13. A non-transitory computer-readable recording medium storing a program for controlling a computer of a composite image generating apparatus, the program causing the computer to execute steps of:
  inputting a composite target image;
  determining a first mount image on the basis of an impression value along a first impression axis, with respect to the input composite target image;
  generating a first composite image by combining at least a part of the input composite target image and the determined first mount image;
  displaying the generated first composite image;
  designating a first desired impression value on the first impression axis;
  determining a second mount image on the basis of the designated first desired impression value;
  generating a second composite image by combining at least a part of the input composite target image and the determined second mount image; and
  displaying the generated second composite image,
  wherein the program further causes the computer to execute steps of:
    inputting a plurality of composite target images;
    distributing impression values of the plurality of composite target images in an impression area defined by at least two impression axes; and
    determining a particular axis on which a dispersion of the impression values distributed in the impression area becomes the maximum, as the first impression axis.

* * * * *